(12) United States Patent
Musselman et al.

(10) Patent No.: US 11,913,861 B2
(45) Date of Patent: Feb. 27, 2024

(54) ELECTROSTATIC LOADING OF POWDER SAMPLES FOR IONIZATION

(71) Applicant: IonSense Inc., Saugus, MA (US)

(72) Inventors: Brian D Musselman, Melrose, MA (US); Frederick Li, Everett, MA (US)

(73) Assignee: Bruker Scientific LLC, Billerica, MA (US)

( * ) Notice: Subject to any disclaimer, the term of this patent is extended or adjusted under 35 U.S.C. 154(b) by 318 days.

(21) Appl. No.: 17/330,121

(22) Filed: May 25, 2021

(65) Prior Publication Data
US 2021/0372892 A1    Dec. 2, 2021

Related U.S. Application Data

(60) Provisional application No. 63/030,081, filed on May 26, 2020.

(51) Int. Cl.
*G01N 1/38* (2006.01)
*G01N 1/44* (2006.01)
(Continued)

(52) U.S. Cl.
CPC ............... *G01N 1/38* (2013.01); *G01N 1/44* (2013.01); *H01J 49/0459* (2013.01);
(Continued)

(58) Field of Classification Search
USPC .......................................................... 436/149
See application file for complete search history.

(56) References Cited

U.S. PATENT DOCUMENTS

| | | | |
|---|---|---|---|
| 3,633,027 A | 1/1972 | Rhyage | |
| 3,957,470 A | 5/1976 | Dawes | |

(Continued)

FOREIGN PATENT DOCUMENTS

| | | | |
|---|---|---|---|
| CN | 106796866 | * | 5/2017 |
| DE | 102007015542 | | 10/2007 |

(Continued)

OTHER PUBLICATIONS

The AccuTOF-DART Mass Spectrometer, Jan. 1, 2006, pp. 1-6; www.jeolusa.com/SERVICESUPPORT/ApplicationsResources/AnalyticalInstruments/Documents/Downloads/tabid/337/DMXModule/693/CommandCore_Download/Default.aspx?EntryId=171.

(Continued)

*Primary Examiner* — Xiaoyun R Xu
(74) *Attorney, Agent, or Firm* — Benoît & Côté, Inc.

(57) ABSTRACT

Methods and devices for pretreatment of a conducting sampling substrate which enable an electrostatic charge to be used to transfer analyte molecules onto a sampling substrate, where the analyte molecules are in powder or particulate form. In an embodiment of the present invention, the electrostatic charge can be used to transfer powder samples containing nitrogenous bases, nucleosides, food additives, and prescription drugs such as acetaminophen, oxycodone, and dextromethorphan. In an embodiment of the present invention, a powder sample is transferred to a pre-treated sampling substrate using an electrostatic charge. The spatial distribution of the powder on the original surface is retained on the pre-treated sampling substrate using the electrostatic charge transfer. The electrostatic charge transfer can be used to transfer powder samples present on a surface or in the chambers of 96, 384 and 1536 well plate formats to either pins or mesh and analyzed with ambient desorption ionization.

16 Claims, 19 Drawing Sheets

(51) Int. Cl.
*H01J 49/16* (2006.01)
*H01J 49/12* (2006.01)
*H01J 49/04* (2006.01)

(52) U.S. Cl.
CPC ............ *H01J 49/12* (2013.01); *H01J 49/165* (2013.01); *G01N 2001/386* (2013.01)

(56) References Cited

U.S. PATENT DOCUMENTS

| | | | |
|---|---|---|---|
| 4,016,421 A | 4/1977 | Hull |
| 4,144,451 A | 3/1979 | Kambara |
| 4,213,326 A | 7/1980 | Brodasky |
| 4,542,293 A | 9/1985 | Fenn |
| 4,546,253 A | 10/1985 | Tsuchiya |
| 4,654,052 A | 3/1987 | Sharp |
| 4,662,914 A | 5/1987 | Hansen |
| 4,861,988 A | 8/1989 | Henion |
| 4,941,618 A | 7/1990 | Hildebrand |
| 5,012,052 A | 4/1991 | Hayes |
| 5,055,677 A | 10/1991 | Amirav |
| 5,137,553 A | 8/1992 | Dawes |
| 5,192,865 A | 3/1993 | Zhu |
| 5,306,412 A | 4/1994 | Whitehouse |
| 5,352,892 A | 10/1994 | Mordehai |
| 5,367,163 A | 11/1994 | Otsuka |
| 5,381,008 A | 1/1995 | Tanner |
| 5,412,208 A | 5/1995 | Covey |
| 5,448,062 A | 9/1995 | Cooks |
| 5,552,599 A | 9/1996 | Giessmann |
| 5,559,326 A | 9/1996 | Goodley |
| 5,614,711 A | 3/1997 | Li |
| 5,624,537 A | 4/1997 | Turner |
| 5,629,518 A | 5/1997 | Grotheer |
| 5,684,300 A | 11/1997 | Taylor |
| 5,716,825 A | 2/1998 | Hancock |
| 5,736,741 A | 4/1998 | Bertsch |
| 5,788,166 A | 8/1998 | Valaskovic |
| 5,859,433 A | 1/1999 | Franzen |
| 5,868,322 A | 2/1999 | Loucks, Jr. |
| 5,877,495 A | 3/1999 | Takada |
| 5,889,404 A | 3/1999 | Abdel-Rahman |
| 5,959,297 A | 9/1999 | Weinberg |
| 5,997,746 A | 12/1999 | Valaskovic |
| 6,085,601 A | 7/2000 | Linker |
| 6,107,628 A | 8/2000 | Smith |
| 6,124,675 A | 9/2000 | Betrand |
| 6,188,065 B1 | 2/2001 | Takada |
| 6,190,559 B1 | 2/2001 | Valaskovic |
| 6,225,623 B1 | 5/2001 | Turner |
| 6,297,499 B1 | 10/2001 | Fenn |
| 6,335,525 B1 | 1/2002 | Takada |
| 6,359,275 B1 | 3/2002 | Bertsch |
| 6,395,183 B1 | 5/2002 | Valaskovic |
| 6,562,211 B1 | 5/2003 | Kunnecke |
| 6,583,408 B2 | 6/2003 | Smith |
| 6,600,155 B1 | 7/2003 | Andrien, Jr. |
| 6,646,256 B2 | 11/2003 | Gourley |
| 6,649,907 B2 | 11/2003 | Ebeling |
| 6,670,608 B1 | 12/2003 | Taylor |
| 6,690,006 B2 | 2/2004 | Valaskovic |
| 6,713,757 B2 | 3/2004 | Tanner |
| 6,717,139 B2 | 4/2004 | Taniguchi |
| 6,723,985 B2 | 4/2004 | Schultz |
| 6,744,041 B2 | 6/2004 | Sheehan |
| 6,744,046 B2 | 6/2004 | Valaskovic |
| 6,753,523 B1 | 6/2004 | Whitehouse |
| 6,784,424 B1 | 8/2004 | Willoughby |
| 6,794,642 B2 | 9/2004 | Bateman |
| 6,803,565 B2 | 10/2004 | Smith |
| 6,806,468 B2 | 10/2004 | Laiko |
| 6,818,889 B1 | 11/2004 | Sheehan |
| 6,861,647 B2 | 3/2005 | Reilly |
| 6,875,980 B2 | 4/2005 | Bateman |
| 6,878,930 B1 | 4/2005 | Willoughby |
| 6,888,132 B1 | 5/2005 | Sheehan |
| 6,914,243 B2 | 7/2005 | Sheehan |
| 6,943,347 B1 | 9/2005 | Willoughby |
| 6,949,739 B2 | 9/2005 | Franzen |
| 6,949,740 B1 | 9/2005 | Sheehan |
| 6,949,741 B2 | 9/2005 | Cody |
| 6,956,205 B2 | 10/2005 | Park |
| 6,977,372 B2 | 12/2005 | Valaskovic |
| 6,979,816 B2 | 12/2005 | Tang |
| 6,987,264 B1 | 1/2006 | Whitehouse |
| 6,992,299 B2 | 1/2006 | Lee |
| 7,015,466 B2 | 3/2006 | Takats |
| 7,019,289 B2 | 3/2006 | Wang |
| 7,034,292 B1 | 4/2006 | Whitehouse |
| 7,041,972 B2 | 5/2006 | Bajic |
| 7,049,584 B1 | 5/2006 | Whitehouse |
| 7,053,368 B2 | 5/2006 | Thakur |
| 7,064,317 B2 | 6/2006 | McLuckey |
| 7,071,464 B2 | 7/2006 | Reinhold |
| 7,081,618 B2 | 7/2006 | Laprade |
| 7,081,621 B1 | 7/2006 | Willoughby |
| 7,095,019 B1 | 8/2006 | Sheehan |
| 7,098,452 B2 | 8/2006 | Schneider |
| 7,112,785 B2 | 9/2006 | Laramee |
| 7,138,626 B1 | 11/2006 | Karpetsky |
| 7,157,698 B2 | 1/2007 | Makarov |
| 7,161,145 B2 | 1/2007 | Oser |
| 7,196,525 B2 | 3/2007 | Sparkman |
| 7,247,495 B2 | 7/2007 | Amirav |
| 7,253,406 B1 | 8/2007 | Sheehan |
| 7,332,345 B2 | 2/2008 | Darrach |
| 7,423,261 B2 | 9/2008 | Truche |
| 7,429,731 B1 | 9/2008 | Karpetsky |
| 7,462,826 B2 | 12/2008 | Schneider |
| 7,544,933 B2 | 6/2009 | Cooks |
| 7,569,812 B1 | 8/2009 | Karpetsky |
| 7,582,864 B2 | 9/2009 | Verentchikov |
| 7,700,913 B2 | 4/2010 | Musselman |
| 7,705,297 B2 | 4/2010 | Musselman |
| 7,714,281 B2 | 5/2010 | Musselman |
| 7,772,546 B2 | 8/2010 | Jackson |
| 7,777,181 B2 | 8/2010 | Musselman |
| 7,815,484 B2 | 10/2010 | Kriman |
| 7,858,926 B1 | 12/2010 | Whitehouse |
| 7,893,408 B2 | 2/2011 | Hieftje |
| 7,915,579 B2 | 3/2011 | Chen |
| 7,923,681 B2 | 4/2011 | Collings |
| 7,928,364 B2 | 4/2011 | Musselman |
| 7,929,138 B1 | 4/2011 | Webb |
| 7,982,183 B2 | 7/2011 | Marakov |
| 7,982,185 B2 | 7/2011 | Whitehouse |
| 8,003,935 B2 | 8/2011 | Robinson |
| 8,026,477 B2 | 9/2011 | Musselman |
| 8,044,346 B2 | 10/2011 | Kostiainen |
| RE43,078 E | 1/2012 | Cody |
| 8,101,910 B2 | 1/2012 | Loboda |
| 8,207,497 B2 | 6/2012 | Musselman |
| 8,217,341 B2 | 7/2012 | Musselman |
| 8,242,459 B2 | 8/2012 | Sun |
| 8,278,619 B2 | 10/2012 | Makarov |
| 8,304,718 B2 | 11/2012 | Ouyang |
| 8,308,339 B2 | 11/2012 | Karpetsky |
| 8,334,507 B1 | 12/2012 | Whitehouse |
| 8,362,418 B2 | 1/2013 | Xu |
| 8,410,431 B2 | 4/2013 | Ouyang |
| 8,410,452 B2 | 4/2013 | Koenig |
| 8,421,005 B2 | 4/2013 | Musselman |
| 8,440,965 B2 | 5/2013 | Musselman |
| 8,481,922 B2 | 7/2013 | Musselman |
| 8,497,474 B2 | 7/2013 | Musselman |
| 8,519,354 B2 | 8/2013 | Charipar |
| 8,525,109 B2 | 9/2013 | Musselman |
| 8,558,170 B1 | 10/2013 | Musselman |
| 8,563,945 B2 | 10/2013 | Musselman |
| RE44,603 E | 11/2013 | Cody |
| 8,592,756 B2 | 11/2013 | Ouyang |
| 8,592,758 B1 | 11/2013 | Nilles |
| 8,604,423 B2 | 12/2013 | Enke |
| 8,648,295 B2 | 2/2014 | Enke |
| 8,664,000 B2 | 3/2014 | Yang |

(56) References Cited

U.S. PATENT DOCUMENTS

| | | |
|---|---|---|
| 8,686,351 B2 | 4/2014 | Ouyang |
| 8,704,167 B2 | 4/2014 | Cooks |
| 8,710,437 B2 | 4/2014 | Cooks |
| 8,729,496 B2 | 5/2014 | Musselman |
| 8,754,365 B2 | 6/2014 | Krechmer |
| 8,766,177 B2 * | 7/2014 | Verbeck, IV ....... H01J 49/0404 250/288 |
| 8,766,178 B2 | 7/2014 | Ouyang |
| 8,803,085 B2 | 8/2014 | Ouyang |
| 8,816,275 B2 | 8/2014 | Ouyang |
| 8,822,949 B2 | 9/2014 | Krechmer |
| 8,853,627 B2 | 10/2014 | Ouyang |
| 8,859,956 B2 | 10/2014 | Ouyang |
| 8,859,957 B2 | 10/2014 | Ouyang |
| 8,859,958 B2 | 10/2014 | Ouyang |
| 8,859,959 B2 | 10/2014 | Ouyang |
| 8,859,986 B2 | 10/2014 | Cooks |
| 8,890,063 B2 | 11/2014 | Ouyang |
| 8,895,916 B2 | 11/2014 | Musselman |
| 8,895,918 B2 | 11/2014 | Cooks |
| 8,901,488 B1 | 12/2014 | Musselman |
| 8,927,926 B2 | 1/2015 | Shimada |
| 8,932,875 B2 | 1/2015 | Cooks |
| 8,933,398 B2 | 1/2015 | Ouyang |
| 8,937,288 B1 | 1/2015 | Cooks |
| 8,963,079 B2 | 2/2015 | Ouyang |
| 8,963,101 B2 | 2/2015 | Krechmer |
| 9,024,254 B2 | 5/2015 | Cooks |
| 9,064,674 B2 | 6/2015 | Ouyang |
| 9,105,435 B1 | 8/2015 | Musselman |
| 9,116,154 B2 | 8/2015 | Ouyang |
| 9,159,540 B2 | 10/2015 | Ouyang |
| 9,165,752 B2 | 10/2015 | Cooks |
| 9,224,587 B2 | 12/2015 | Krechmer |
| 9,230,792 B2 | 1/2016 | Cooks |
| 9,337,007 B2 | 5/2016 | Musselman |
| 9,390,899 B2 | 7/2016 | Musselman |
| 9,484,195 B2 | 11/2016 | Ouyang |
| 9,500,630 B2 | 11/2016 | Cooks |
| 9,514,923 B2 | 12/2016 | Krechmer |
| 9,538,945 B2 | 1/2017 | Cooks |
| 9,546,979 B2 | 1/2017 | Cooks |
| 9,548,192 B2 | 1/2017 | Cooks |
| 9,551,079 B2 | 1/2017 | Cooks |
| 9,558,926 B2 | 1/2017 | Musselman |
| 9,607,306 B2 | 3/2017 | Hieftje |
| RE46,366 E | 4/2017 | Cody |
| 9,620,344 B2 | 4/2017 | Cooks |
| 9,633,827 B2 | 4/2017 | Musselman |
| 9,700,251 B2 | 7/2017 | Cooks |
| 9,704,700 B2 | 7/2017 | Cooks |
| 9,719,181 B2 | 8/2017 | Cooks |
| 9,733,228 B2 | 8/2017 | Cooks |
| 9,824,875 B2 | 11/2017 | Musselman |
| 9,941,105 B2 | 4/2018 | Cooks |
| 9,960,029 B2 | 5/2018 | Krechmer |
| 10,004,440 B2 | 6/2018 | Cooks |
| 10,008,374 B2 | 6/2018 | Ouyang |
| 10,014,169 B2 | 7/2018 | Cooks |
| 10,056,243 B2 | 8/2018 | Musselman |
| 10,079,140 B2 | 9/2018 | Cooks |
| 10,088,461 B2 | 10/2018 | Cooks |
| 10,090,142 B2 | 10/2018 | Musselman |
| 10,113,242 B2 | 10/2018 | Cooks |
| 10,134,575 B2 | 11/2018 | Krechmer |
| 10,283,340 B2 | 5/2019 | Musselman |
| 10,395,911 B2 | 8/2019 | Cooks |
| 10,395,913 B2 | 8/2019 | Cooks |
| 10,553,417 B2 | 2/2020 | Musselman |
| 10,636,640 B2 | 4/2020 | Musselman |
| 10,643,833 B2 | 5/2020 | Krechmer |
| 10,643,834 B2 | 5/2020 | Musselman |
| 10,679,839 B2 | 6/2020 | Musselman |
| 11,049,707 B2 | 6/2021 | Musselman |
| 2002/0121596 A1 | 9/2002 | Laiko |
| 2002/0121598 A1 | 9/2002 | Park |
| 2002/0162967 A1 | 11/2002 | Atkinson |
| 2002/0185593 A1 | 12/2002 | Doring |
| 2002/0185595 A1 | 12/2002 | Smith |
| 2002/0185606 A1 | 12/2002 | Smith |
| 2003/0052268 A1 | 3/2003 | Doroshenko |
| 2003/0070913 A1 | 4/2003 | Miller |
| 2004/0094706 A1 | 5/2004 | Covey |
| 2004/0129876 A1 | 7/2004 | Franzen |
| 2004/0159784 A1 | 8/2004 | Doroshenko |
| 2005/0230635 A1 | 10/2005 | Takats |
| 2005/0236374 A1 | 10/2005 | Blankenship |
| 2006/0266941 A1 | 11/2006 | Vestal |
| 2007/0114389 A1 | 5/2007 | Karpetsky |
| 2007/0228271 A1 | 10/2007 | Truche |
| 2007/0272849 A1 | 11/2007 | Kirihara |
| 2008/0156985 A1 | 7/2008 | Venter |
| 2008/0202915 A1 | 8/2008 | Hieftje |
| 2008/0217254 A1 | 9/2008 | Anderson |
| 2009/0090197 A1 | 4/2009 | Finlay |
| 2009/0090858 A1 | 4/2009 | Musselman |
| 2010/0078550 A1 | 4/2010 | Wiseman |
| 2010/0140468 A1 | 6/2010 | Musselman |
| 2011/0215798 A1 | 9/2011 | Beer |
| 2012/0006983 A1 | 1/2012 | Cody |
| 2012/0068063 A1 | 3/2012 | Fernandez |
| 2012/0145890 A1 | 6/2012 | Goodlett |
| 2012/0208004 A1 | 8/2012 | Wolcott |
| 2012/0223226 A1 | 9/2012 | Rafferty |
| 2012/0312980 A1 | 12/2012 | Whitehouse |
| 2012/0322683 A1 | 12/2012 | Liu |
| 2013/0020482 A1 | 1/2013 | Enke |
| 2013/0037710 A1 | 2/2013 | Wu |
| 2013/0092832 A1 | 4/2013 | Enke |
| 2013/0273552 A1 | 10/2013 | Ohashi |
| 2013/0284915 A1 | 10/2013 | Shimada |
| 2013/0299688 A1 | 11/2013 | Balogh |
| 2014/0024822 A1 | 1/2014 | Connolly |
| 2015/0364310 A1 | 12/2015 | Musselman |
| 2016/0314956 A1 | 10/2016 | Cooks |
| 2017/0082604 A1 | 3/2017 | Ouyang |
| 2017/0084438 A1 | 3/2017 | Cooks |
| 2017/0084442 A1* | 3/2017 | Ng ..................... H01J 49/0431 |
| 2017/0103879 A1 | 4/2017 | Cooks |
| 2017/0130352 A1 | 5/2017 | Cooks |
| 2017/0135613 A1 | 5/2017 | Cooks |
| 2017/0148622 A1 | 5/2017 | Musselman |
| 2017/0154761 A1 | 6/2017 | Ouyang |
| 2017/0168032 A1 | 6/2017 | Cooks |
| 2017/0221695 A1 | 8/2017 | Cooks |
| 2017/0229299 A1 | 8/2017 | Musselman |
| 2017/0248547 A1 | 8/2017 | Campbell |
| 2017/0248607 A1 | 8/2017 | Cooks |
| 2017/0273605 A1 | 9/2017 | Cooks |
| 2017/0287690 A1 | 10/2017 | Cooks |
| 2017/0309462 A1 | 10/2017 | Cooks |
| 2017/0335477 A1 | 11/2017 | Cooks |
| 2017/0343526 A1 | 11/2017 | Cooks |
| 2017/0349547 A1 | 12/2017 | Cooks |
| 2018/0017535 A1 | 1/2018 | Cooks |
| 2018/0024108 A1 | 1/2018 | Cooks |
| 2018/0033603 A1 | 2/2018 | Cooks |
| 2018/0040464 A1 | 2/2018 | Cooks |
| 2018/0043327 A1 | 2/2018 | Cooks |
| 2018/0047552 A1 | 2/2018 | Cooks |
| 2018/0061620 A1 | 3/2018 | Cooks |
| 2018/0076015 A1 | 3/2018 | Musselman |
| 2018/0188273 A1 | 7/2018 | Cooks |
| 2018/0204712 A1 | 7/2018 | Cooks |
| 2018/0247804 A1 | 8/2018 | Shelley |
| 2018/0275118 A1 | 9/2018 | Cooks |
| 2018/0279927 A1 | 10/2018 | Cooks |
| 2018/0286651 A1 | 10/2018 | Ouyang |
| 2018/0330934 A1 | 11/2018 | Cooks |
| 2019/0206668 A1 | 7/2019 | Cooks |
| 2019/0219555 A1 | 7/2019 | Cooks |
| 2019/0237315 A1 | 8/2019 | Cooks |
| 2019/0371592 A1 | 12/2019 | Musselman |
| 2020/0020516 A1 | 1/2020 | Cooks |

(56) References Cited

U.S. PATENT DOCUMENTS

| | | |
|---|---|---|
| 2020/0110010 A1 | 4/2020 | Pawliszyn |
| 2020/0121229 A1 | 4/2020 | Cooks |
| 2020/0219711 A1 | 7/2020 | Cooks |
| 2020/0321208 A1 | 10/2020 | Cooks |
| 2020/0340962 A1 | 10/2020 | Cooks |
| 2020/0355587 A1 | 11/2020 | Pawliszyn |
| 2020/0357620 A1 | 11/2020 | Cooks |
| 2020/0357671 A1 | 11/2020 | Ouyang |
| 2020/0381237 A1 | 12/2020 | Cooks |
| 2020/0381238 A1 | 12/2020 | Cooks |
| 2020/0381239 A1 | 12/2020 | Ouyang |
| 2020/0402786 A1 | 12/2020 | Cooks |
| 2021/0098245 A1 | 4/2021 | Shelley |
| 2021/0166927 A1 | 6/2021 | Ouyang |
| 2021/0265155 A1 | 8/2021 | Cooks |

FOREIGN PATENT DOCUMENTS

| | | |
|---|---|---|
| EP | 1434050 | 6/2004 |
| GB | 2263578 | 7/1993 |
| JP | 50-106694 | 8/1975 |
| JP | 51-120288 | 10/1976 |
| JP | 52-91494 | 8/1977 |
| JP | 60-41748 | 3/1985 |
| JP | 2003185635 | 7/2003 |
| JP | 2003222574 | 8/2003 |
| JP | 2005-150027 | 6/2005 |
| JP | 2007525677 | 6/2007 |
| JP | 2009539114 | 11/2009 |
| WO | WO03025973 | 3/2003 |
| WO | WO03081205 | 10/2003 |
| WO | WO2004068131 | 8/2004 |
| WO | WO2005094389 | 10/2005 |
| WO | WO2008054393 | 5/2008 |
| WO | WO2008082603 | 7/2008 |
| WO | WO2015195599 | 12/2015 |
| WO | WO2016145041 | 9/2016 |
| WO | WO2017040359 | 3/2017 |
| WO | WO2017053911 | 3/2017 |
| WO | WO2017070478 | 4/2017 |
| WO | WO2017079193 | 5/2017 |
| WO | WO2017127670 | 7/2017 |
| WO | WO2017132444 | 8/2017 |
| WO | WO2017180871 | 10/2017 |
| WO | WO2018175713 | 9/2018 |

OTHER PUBLICATIONS

Cody, R.B. et al., "Versatile New Ion Source for the Analysis of Materials in Open Air under Ambient Conditions" Anal. Chem., 2005, 77, 2297-2302.
Cooks, R.G. et al., "Ambient Mass Spectrometry", Science, 2006, 311, 1566-1570.
Dalton, C.N. et al., "Electrospray-Atmospheric Sampling Glow Discharge Ionization Source for the Direct Analysis of Liquid Samples", Analytical Chemistry, Apr. 1, 2003, vol. 75, No. 7, pp. 1620-1627.
Garimella, S. et al., "Gas-flow assisted ion transfer for mass spectrometry", J. Mass Spectrom. 2012, 17, 201-207.
Guzowski, J.P. Jr. et al., "Development of a Direct Current Gas Sampling Glow Discharge Ionization Source for the Time-of-Flight Mass Spectrometer", J. Anal. At. Spectrom., 14, 1999, pp. 1121-1127.
Haddad, R., et al., "Easy Ambient Sonic-Spray Ionization Mass Spectrometry Combined with Thin-Layer Chromatography," *Analytical Chemistry*, vol. 80, No. 8, Apr. 15, 2008, pp. 2744-2750.
Harris, Glenn A. et al., Ambient Sampling/Ionization Mass Spectrometry: Applications and Current Trends, Apr. 15, 2011, Anal. Chem. 2011, 83, pp. 4508-4538.
Harris, Glenn A. et al., Simulations and Experimental Investigation of Atmospheric Transport in an Ambient Metastable-Induced Chemical Ionization Source, Anal. Chem. 2009, 81, pp. 322-329.
Hill, C.A. et al., "A pulsed corona discharge switchable high resolution ion mobility spectrometer-mass spectrometer", Analyst, 2003, 128, pp. 55-60.
Hiraoka, K. et al., "Atmospheric-Pressure Penning Ionization Mass Spectrometry", Rapid Commun. Mass Spectrom., 18, 2004, pp. 2323-2330.
McLuckey, S.A. et al., "Atmospheric Sampling Glow Discharge Ionization Source for the Determination of Trace Organic Compounds in Ambient Air", Anal. Chem., 60, 1988, pp. 2220-2227.
Otsuka, K. et al., "An Interface for Liquid Chromatography/Liquid Ionization Mass Spectrometer", Analytical Sciences, Oct. 1988, vol. 4, pp. 467-472.
Takáts et al., "Mass Spectrometry Sampling Under Ambient Conditions with Desorption Electrospray Ionization," Science, vol. 306, No. 5695, Oct. 15, 2004, pp. 471-473.
Tembreull, R., et al., "Pulsed Laser Desorption with Resonant Two-Photon Ionization Detection in Supersonic Beam Mass Spectrometry," Anal. Chem., vol. 58, 1986, pp. 1299-1303, p. 1299.
Ifa et al., Ambient Ionization Mass Spectrometry for Cancer Diagnosis and Surgical Margin Evaluation, Clinical Chem., (2016) 62, 111-123.
Voelker, S.E. et al., "Evaluation of four field portable devices for the rapid detection of mitragynine in suspected kratom products" 201 (2021) 114104.
Yang et al., Argon Direct Analysis in Real Time Mass Spectrometry in Conjunction with Makeup Solvents: A Method for Analysis of Labile Compounds, Anal Chem., (2013) 83, 1305-1309.
Yu et al., Bioanalysis without Sample Cleanup or Chromatography: The Evaluation and Initial Implementation of Direct Analysis in Real Time Ionization Mass Spectroscopy for the Quantification of Drugs in Biological Matrixes, Anal Chem., (2009) 81, 193-202.
Zang et al., Comparison of Ambient and Atmospheric Pressure Ion Sources for Cystic Fibrosis Exhaled Breath Condensate Ion Mobility-Mass Spectrometry Metabolomics, J. Am. Soc. Mass Spectrom., (2017) 28, 1489-1496.
Zhang et al., Will Ambient Ionization Mass Spectrometry Become an Integral Technology in the Operating Room of the Future?, Clinical Chem., (2016) 62, 1172-1174.
Zhao, J. et al., Liquid Sample Injection Using an Atmospheric Pressure Direct Current Glow Discharge Ionization Source, Analytical Chemistry, Jul. 1, 1992, vol. 64, No. 13, pp. 1426-1433.
International Search Report, Application No. PCT/US2007/63006, dated Feb. 5, 2008, 8 pages.
Extended European Search Report, Application No. 07757665.0 PCT/US2007/063006 dated Jan. 7, 2010, 8 pages.
Article 94(3) European Communication, Application No. 07757665.0 PCT/US2007/063006, dated Mar. 14, 2012, 9 pages.
International Search Report, Application No. PCT/US2007/69823, dated Feb. 15, 2008, 8 pages.
Extended European Search Report, Application No. 07797812.0 PCT/US2007/069823, dated Apr. 4, 2010, 9 pages.
Article 94(3) European Communication, Application No. 07797812.0 PCT/US2007/069823, dated Jul. 27, 2012, 9 pages.
International Search Report, Application No. PCT/US2007/69821, dated Feb. 7, 2008.
Extended European Search Report, Application No. 07797811.2 PCT/US2007/069821, dated Mar. 25, 2010, 9 pages.
European Summons, Application No. 07797811.2 PCT/US2007/069821, Feb. 18, 2013, 8 pages.
International Search Report, Application No. PCT/US2007/81439, dated Mar. 20, 2008, 9 pages.
Extended European Search Report, Application No. 07844307.4 PCT/US2007/081439, dated Apr. 14, 2010, 12 pages.
Japanese Office Action, Application No. 2008-558459 PCT/US2007/063006, dated Jan. 19, 2012, 4 pages.
Unofficial Translation of Japanese Office Action, Application No. 2008-558459 PCT/US2007/063006, dated Jan. 19, 2012, 5 pages.
Chinese Office Action, Application No. 200780015974.5 PCT/US2007/063006, dated Feb. 2, 2012, 5 pages.
Chinese Office Action, Application No. 200780015974.5 PCT/US2007/063006, dated Sep. 25, 2012, 8 pages.
Chinese Office Action, Application No. 200780015974.5 PCT/US2007/063006, dated Dec. 26, 2012, 7 pages.

(56) References Cited

OTHER PUBLICATIONS

International Search Report, Application No. PCT/US2012/000061, dated Aug. 6, 2013, 8 pages.
Oral Proceedings European Communication, Application No. 07757665.0 PCT/US2007/063006, Sep. 3, 2013, 5 pages.
Korean Patent Application 7024130/2008 Office Action, dated Jun. 29, 2013, 3 pages.
Korean Patent Application 7024130/2008 Office Action, translation, dated Jun. 29, 2013, 3 pages.
Article 94(3) European Communication, Application No. 07797811.2 PCT/US2007/069821, dated Feb. 2, 2012, 8 pages.
Summons Application No. 07797811.2 PCT/US2007/069821, Feb. 18, 2013, 10 pages.
Chinese Office Action, Application No. 201280003101.3, PCT/US12/00061, dated Jan. 22, 2016, 3 pages.
Translation of Chinese Office Action, Application No. 201280003101.3, PCT/US12/00061, dated Jan. 22, 2016, 18 pages.
Japanese Office Action, Application No. 2013552527, PCT/US12/00061, dated Jan. 22, 2016, 3 pages.
Translation of Japanese Office Action, Application No. 2013552527, PCT/US12/00061, dated Jan. 22, 2016, 4 pages.
Extended European Search Report, Application No. 12742544.5, PCT/US20012/0000061, dated Sep. 12, 2017, 9 pages.
Form 1224, Preliminary amendment, EP Application No. 12742544.5, PCT/US20012/0000061, dated Mar. 22, 2018, 7 pages.
Amended Claims, EP Application No. 12742544.5, PCT/US20012/0000061, Mar. 22, 2018, 3 pages.
Gibbins, J.R., 'Variable Heating Rate Wire Mesh Pyrolysis Apparatus' Rev. Sci. Instr. 60 (1989) pp. 1129-1139.
Korean Patent Application, Application No. 10-2013-7008108, Notice of Final Rejection, dated Jun. 7, 2018, 2 pages.
Korean Patent Application, Application No. 10-2013-7008108, Notice of Final Rejection, dated Sep. 5, 2018, 6 pages.
Translation of Korean Patent Application, Application No. 10-2013-7008108, Notice of Final Rejection, dated Sep. 5, 2018, 5 pages.
Korean Patent Application, Application No. 10-2013-7008108, Response to Notice of Final Rejection, Amendment dated Oct. 31, 2018, 3 pages.
Machine Translation of Amendment, Response to Notice of Final Rejection in Korean Patent Application, Application No. 10-2013-7008108, dated Oct. 31, 2018, 2 pages.
Korean Patent Application, Application No. 10-2013-7008108, Response to Notice of Final Rejection, Argument dated Oct. 31, 2018, 12 pages.
Machine Translation of Argument, Response to Notice of Final Rejection in Korean Patent Application, Application No. 10-2013-7008108, dated Oct. 31, 2018, 27 pages.
International Search Report, Application No. PCT/US19/34041, dated Nov. 1, 2019, 4 pages.

\* cited by examiner

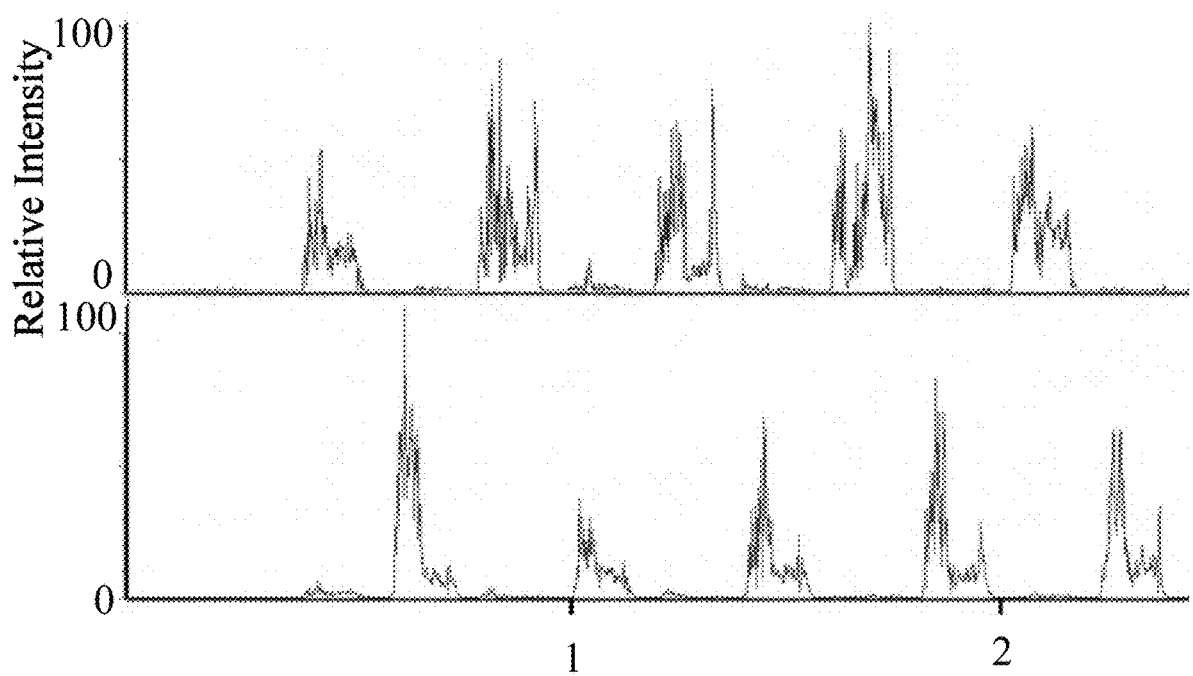

ELECTROSTATIC LOADING OF POWDER SAMPLES FOR IONIZATION

This application claims priority to the U.S. Provisional Patent Application No. 63/030,081 entitled "ELECTROSTATIC LOADING OF POWDER SAMPLES FOR IONIZATION", by inventor Brian D. Musselman, filed May 26, 2020, which is incorporated herein by reference in its entirety and for all purposes.

FIELD OF THE INVENTION

The present invention relates to methods and devices for pretreatment of a conducting sampling substrate for collection and retention of chemical and biological samples where an electrostatic charge is used to transfer substances onto the sampling substrate without physical contact in order to complete analysis of those samples.

BACKGROUND OF THE INVENTION

Analysis of molecules of interest at ambient atmosphere in a laboratory or field setting can be accomplished using an ionizing species to convert the molecules of interest to ions and directing or evacuating the ions into a spectrometer. However, the requirement to make up a solution can be challenging in a field setting.

SUMMARY OF THE INVENTION

In order to simplify the collection of substances of interest without physical contact a perforated conducting sheet is introduced between the metalized sheet used with a typical crime scene tool, an electrostatic dust print lifter, and the surface of interest. Upon activation of the electrostatic field particles of dust, chemicals presented in fingerprints, and powders on the surface of interest are attracted to the charged metalized sheet resulting in a proportion of those substances being collected on the surface of the perforated sheet without physical contact between the surface and the perforated sheet (in contrast to the teachings of U.S. Pat. No. 8,822,949 to Krechmer et al. which is herein expressly incorporated by reference in its entirety and for all purposes). Transfer of the perforated sheet to appropriate analytical instrumentation without requirement for additional sample handling facilitates it rapid analysis for more timely decision making.

In an embodiment of the present invention, a conducting perforated sample collector is pretreated and positioned in close proximity to a surface onto which a solid powder samples is present. Application of a high voltage field to the conducting collector generates a static potential between the surface containing substances of interest and the collector resulting in transfer of a portion of those substances of interest onto the pre-treated sampling surface where it is retained. Analysis to permit detection and characterization of the substance of interest is completed by direct analysis of the collector using an ambient atmosphere ionization enabled mass detector.

The confirmation of identity of substance of interest collected by using this non-contact sample collector can be completed by either direct method or by removal of the substances by extraction, thermal desorption from the collector into an analytical instrument or by direct interrogation with radiation based methods.

BRIEF DESCRIPTION OF THE DRAWINGS

All Direct Analysis Real Time (DART) Atmospheric Pressure Ionization (API) measurements were carried out at 300° C. unless otherwise specified. All samples were prepared by pulverizing objects to powder form with a mortar and pestle. Lose powder sample were deposited on surfaces as dry powder. Wire mesh, perforated Mylar and collections of metal pins were used as the perforated surface for sample collection. All low resolution mass spectrometry was carried out using a DART equipped WATERS QDa mass detector. All high resolution mass spectrometry was carried out using a DART equipped Agilent QTOF mass spectrometer. Various embodiments of the present invention will be described in detail based on the following Figures, where:

FIG. 5A shows the EIC for m/z 315.4 (oxycodone [M+H]$^+$) resulting from the analysis of oxycodone and dextromethorphan deposited in 5 of 10 individual wells of a 384 well plate and transferred with an electrostatic charge to a wire mesh surface analyzed with DART MS, according to an embodiment of the invention;

FIG. 5B shows the EIC for m/z 272.4 (dextromethorphan [M+H]$^+$) resulting from the analysis of oxycodone and dextromethorphan deposited in 5 of 10 individual wells of a 384 well plate and transferred with an electrostatic charge to a wire mesh surface analyzed with DART MS, according to an embodiment of the invention;

DETAILED DESCRIPTION OF THE INVENTION

Figure 1A:
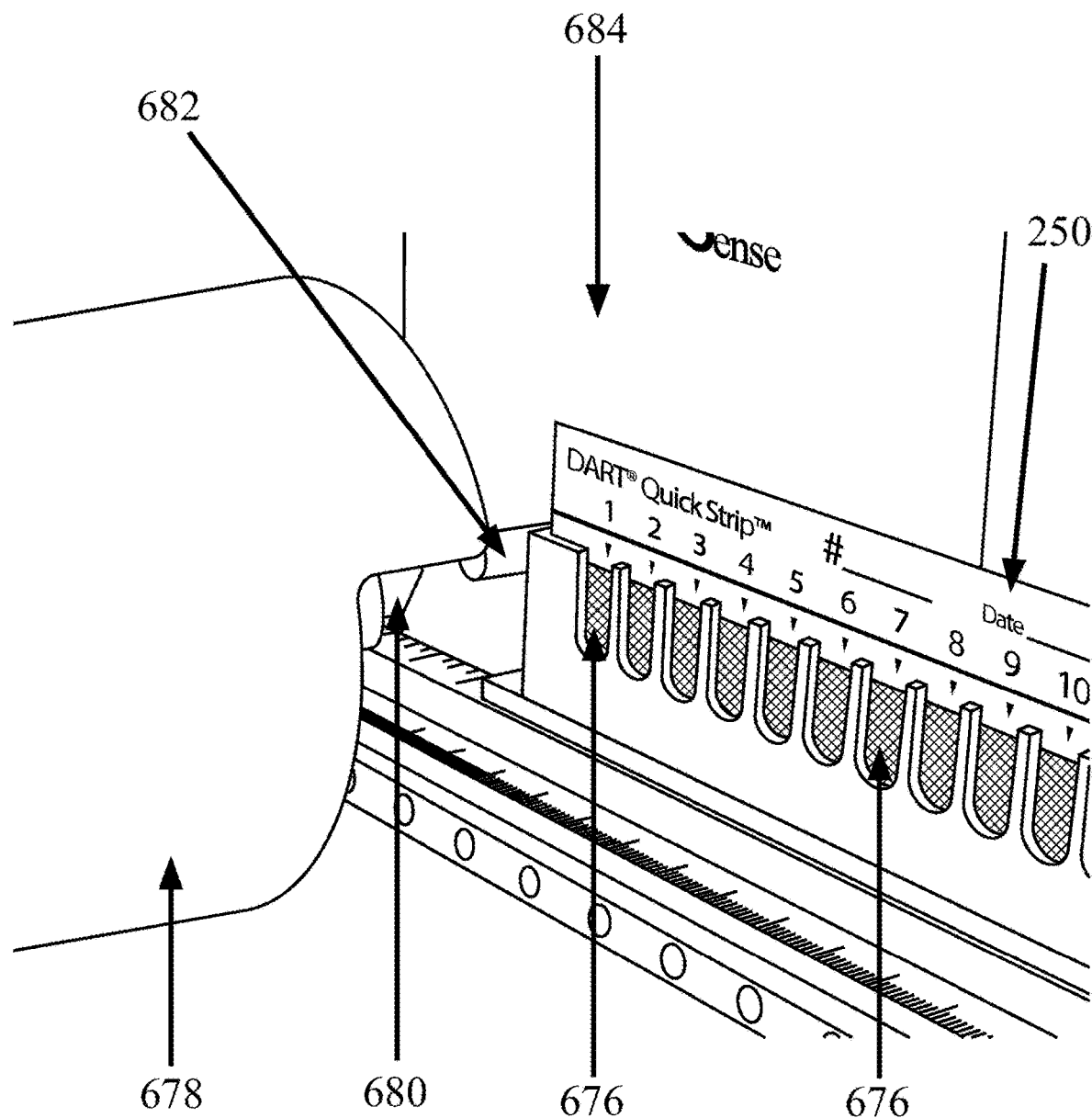
FIG. 1A is the view of a QuickStrip-96 wire mesh mounted on a carrier positioned on the linear rail sample actuator of a DART ionization source where the pin tool is used to present samples for DART analysis.
Figure 1B:
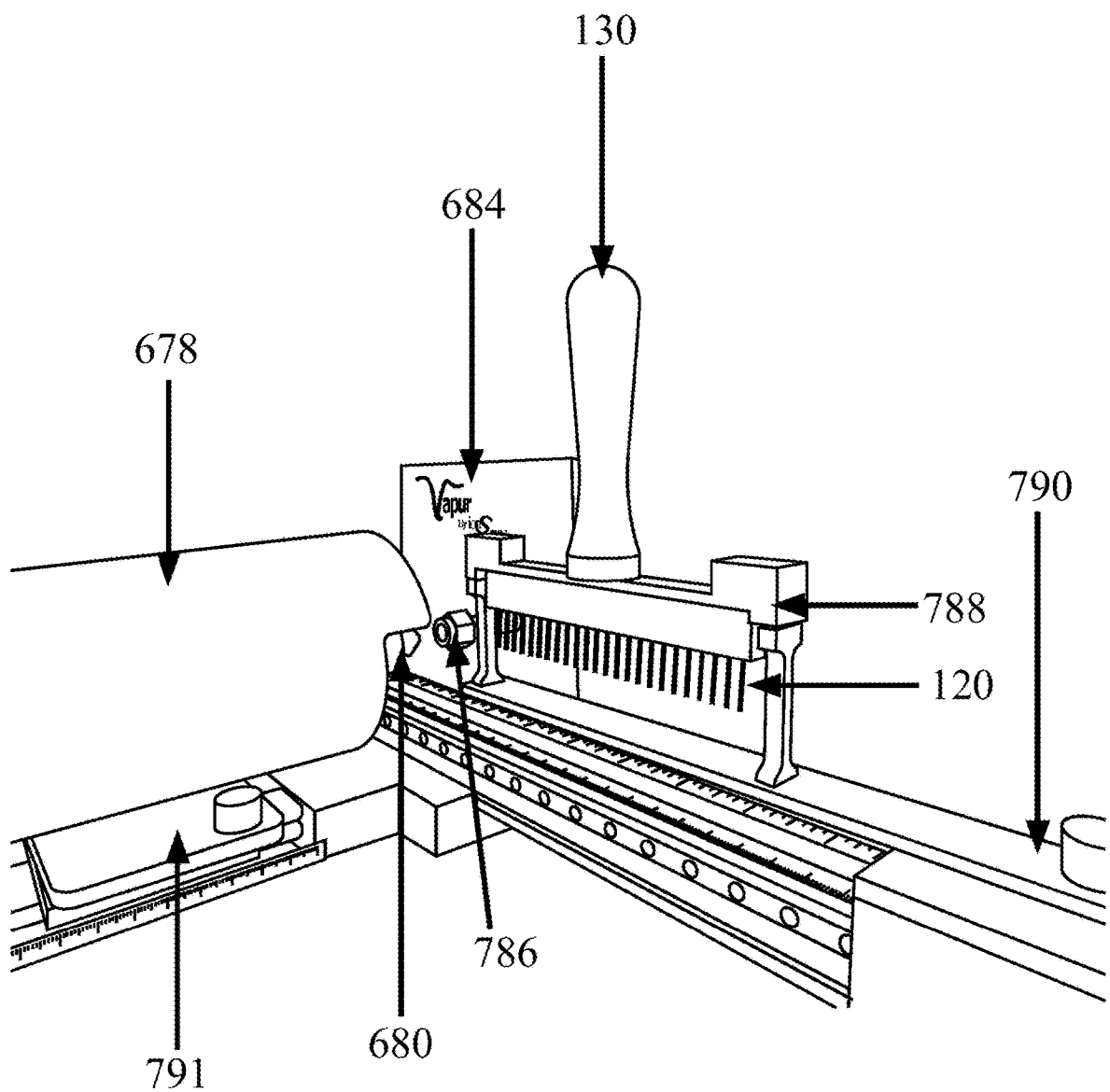
FIG. 1B is the view of a pin tool array mounted on a carrier positioned on the linear rail sample actuator of a DART ionization source where the pin tool is used to present samples for DART analysis.
Figure 2A:
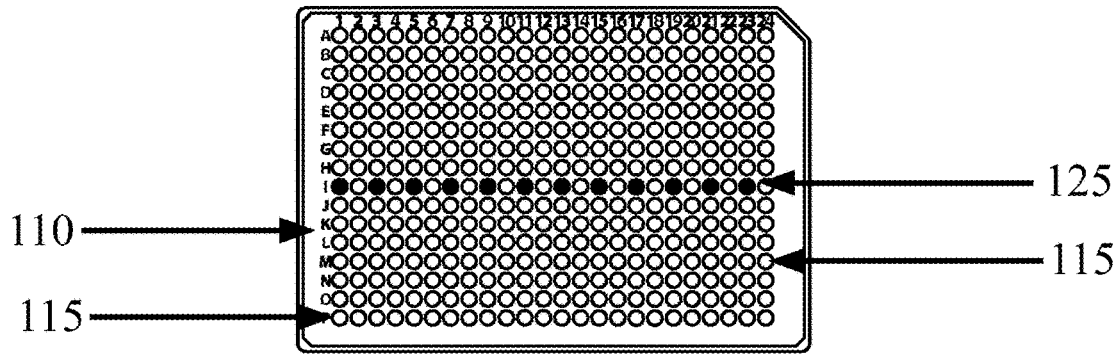
FIG. 2A a 384 well plate 110 where a mixture of oxycodone and acetaminophen powders are deposited in odd numbered wells 125 while even numbered wells 115 of row 'I' and the remainder of the wells of the 384 well plate remain empty.
Figure 2B:
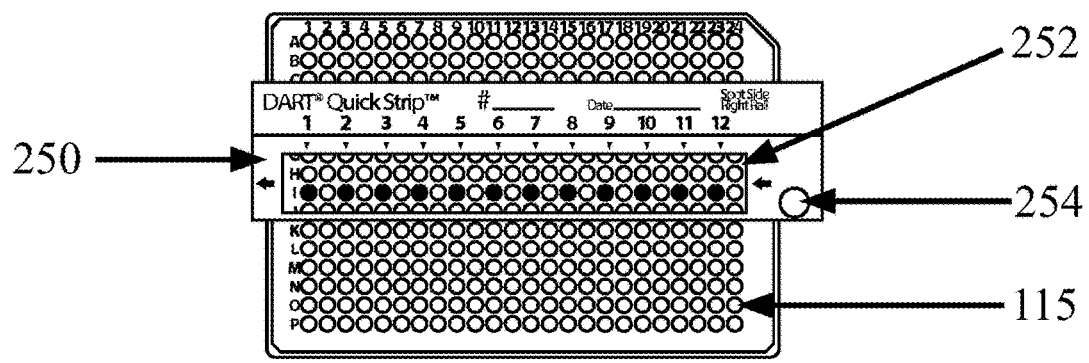
FIG. 2B a pretreated wire mesh surface 252 positioned in a holder 250 is positioned longitudinally along row 'I' of the 384 well plate 110 (see FIG. 2A) covering each of row 'I's 24 wells (of which 12 wells are loaded with sample) the holder dimension is designed to permit separation of the wire mesh surface 252 from the powder in order that the mesh not come into contact with that powder except by the application of the electrostatic potential generated by the action of the electrostatic generator.
Figure 2C:
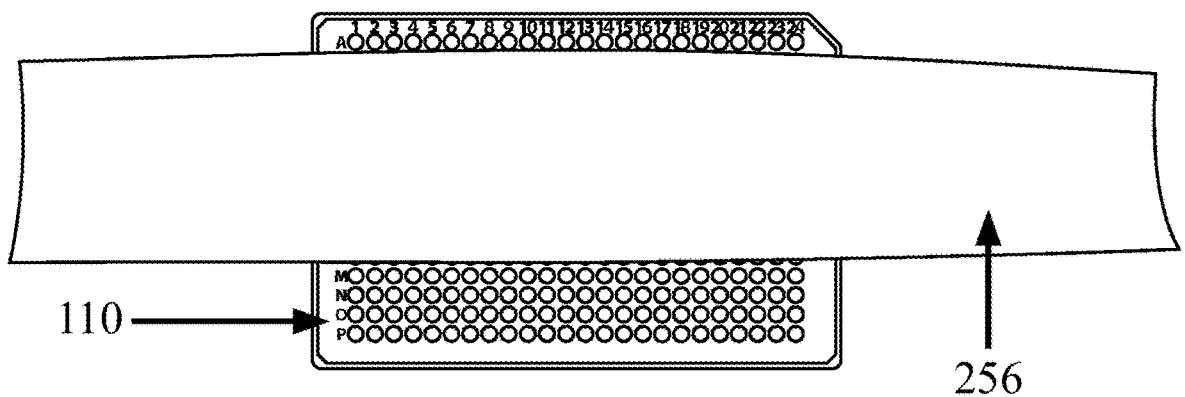
FIG. 2C shows a strip of Mylar®, a metalized plastic 256, positioned on top of the wire mesh surface 252 and the 384 well plate 110 (see FIG. 2B)
Figure 2D:
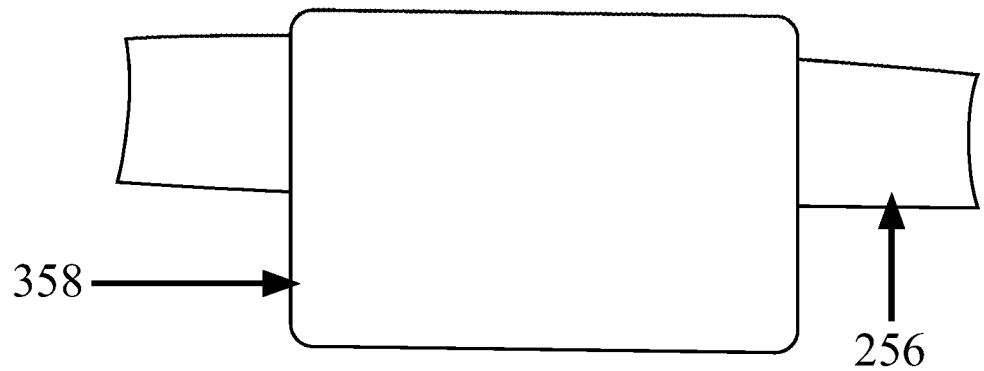
FIG. 2D shows a metal plate 358 positioned on top of the metalized plastic (see FIG. 2C)
Figure 2E:
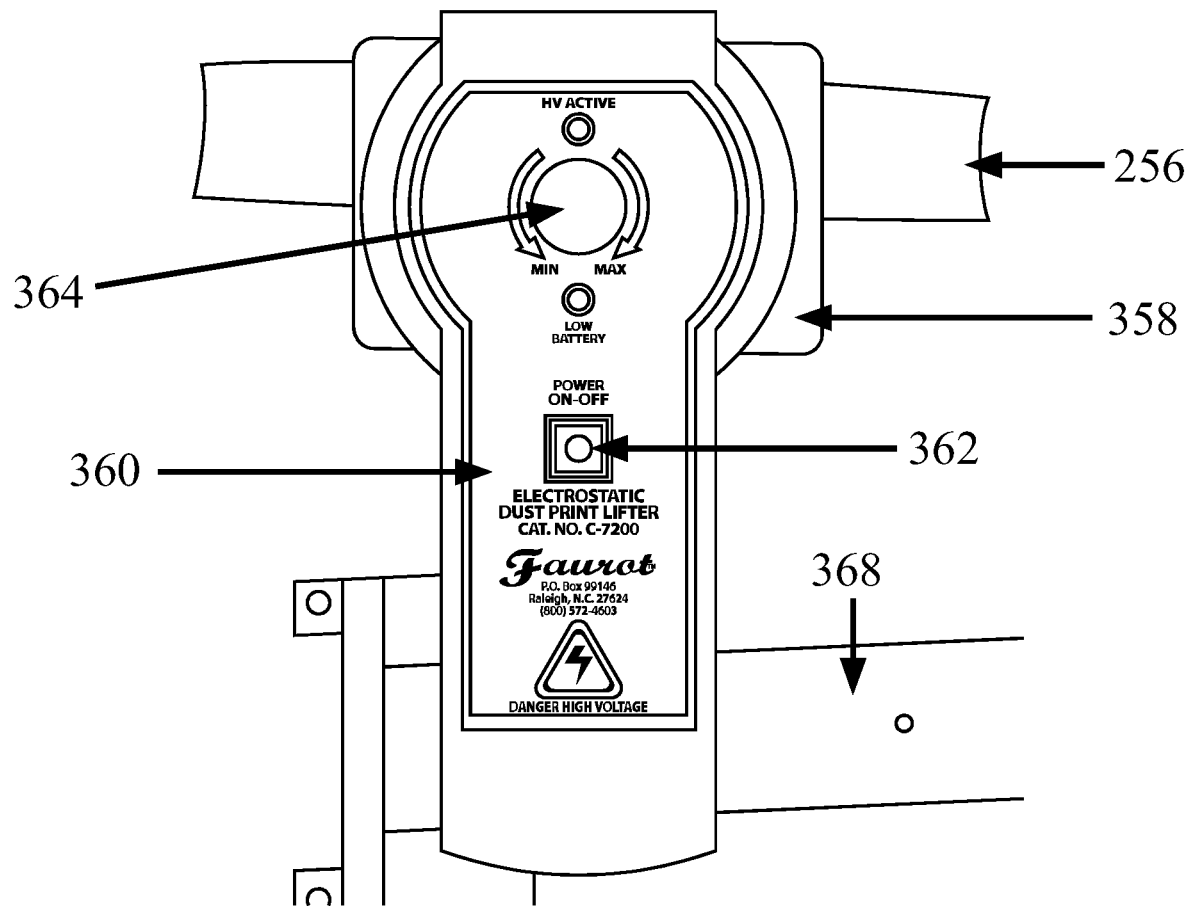
FIG. 2E shows a high voltage power supply 360 positioned such that one of its electrodes is in contact with the metalized plastic 256 see FIG. 2D and the other of its electrodes is in contact with earth ground 368 where upon activation of the electrostatic voltage generator 360 through an on/off contact 362 and a variable high voltage control 364 draws the powder from the sample surface into contact with the wire mesh, according to an embodiment of the invention.

Abbreviations include:

API=Atmospheric Pressure Ionization; CIE=Continuous Ionization Experiment; DART=Direct Analysis Real Time; DESI=Desorption ElectroSpray Ionization; DMS=differential mobility spectrometer; ESI=electrospray ionization; GIS=gas ion separator; HE=Hybrid Experiment; RS=reactive species; PE=Pulsed Experiment; SIM=Single Ion Monitoring; TIC=Total Ion Current.

Definitions of certain terms that are used hereinafter include:

The transitional term "comprising" is synonymous with "including," "containing," or "characterized by," is inclusive or open-ended and does not exclude additional, unrecited elements or method steps.

The transitional phrase "consisting of" excludes any element, step, or ingredient not specified in the claim, but does not exclude additional components or steps that are unrelated to the invention such as impurities ordinarily associated with a composition.

The transitional phrase "consisting essentially of" limits the scope of a claim to the specified materials or steps and those that do not materially affect the basic and novel characteristic(s) of the claimed invention.

The term Gas-Ion Separator (GIS) will be used to refer to a device which separates ions from one or both neutral molecules and neutral atoms allowing the pre-concentration and transfer of the ions to an analysis system. The term 'inlet tube' will be used to refer to the low vacuum side of a GIS. The term 'outlet tube' will be used to refer to the high vacuum side of the GIS. In various embodiments of the invention, the contained tube can be an inlet tube. Active ionization refers to the process where an atmospheric analyzer not utilizing a radioactive nucleus can be used to ionize analyte ions. A capacitive surface is a surface capable of being charged with a potential. A surface is capable of being charged with a potential, if a potential applied to the surface remains for the typical duration time of an experiment, where the potential at the surface is greater than 50% of the potential applied to the surface. A vacuum of atmospheric pressure is approximately 760 torr. Here, 'approximately' encompasses a range of pressures from below $10^1$ atmosphere=$7.6 \times 10^3$ torr to $10^{-1}$ atmosphere=$7.6 \times 10^1$ torr. A vacuum of below $10^{-3}$ torr would constitute a high vacuum. Here, 'approximately' encompasses a range of pressures from below $5 \times 10^{-3}$ torr to $5 \times 10^{-6}$ torr. A vacuum of below $10^{-6}$ torr would constitute a very high vacuum. Here, 'approximately' encompasses a range of pressures from below $5 \times 10^{-6}$ torr to $5 \times 10^{-9}$ torr. In the following, the phrase 'high vacuum' encompasses high vacuum and very high vacuum.

The word 'contact' is used to refer to any process by which molecules of a sample in one or more of the gas, liquid and solid phases becomes adsorbed, absorbed or chemically bound to a surface.

A grid becomes 'coated' with a substrate when a process results in substrate molecules becoming adsorbed, absorbed or chemically bound to a surface. A grid can be coated when beads are adsorbed, absorbed or chemically bound to the grid. A grid can be coated when nano-beads are adsorbed, absorbed or chemically bound to the grid.

A filament means one or more of a loop of wire, a segment of wire, a metal ribbon, a metal strand or an un-insulated wire, animal string, paper, perforated paper, fiber, cloth, silica, fused silica, plastic, plastic foam, polymer, Teflon, polymer impregnated Teflon, cellulose and hydrophobic support material coated and impregnated filaments. In various embodiments of the invention, a filament has a diameter of approximately 50 microns to approximately 2 mm. In measuring the diameter of a filament, approximately indicates plus or minus twenty (20) percent. In an embodiment of the invention, the length of the filament is approximately 1 mm to approximately 25 mm. In measuring the length of a filament, approximately indicates plus or minus twenty (20) percent.

The term 'orientation' means the position of a mesh with respect to another section of mesh or with respect to a grid or a sample holder. In an embodiment of the invention, the mesh, the grid, or the sample holder can be mounted on an X-Y translation stage to enable precise orientation of the samples spotted on the mesh relative to the ionizing species. The controlling electronics and the stepper motor drivers, for the X-Y stages, can be mounted directly onto a box housing the X-Y translation stage, while the microcontroller that controls the orientation can be separately mounted.

The term 'proximity' means the position of a mesh or an area on the mesh with respect to another mesh or other area on the mesh.

The term 'registration' means when an area of a mesh (e.g., the proximal area) lines up with the mesh to deliver the heat from the mesh to the proximal area of the time.

The term 'contacting' means the coming together or touching of objects or surfaces such as the sampling of a surface with an area of a mesh.

The shape of a mesh can be a cylinder, an elliptical cylinder, a long square block, a long rectangular block or a long thin surface.

The term 'hole' refers to a hollow space in an otherwise solid object, with an opening allowing light and/or particles to pass through the otherwise solid object. A hole can be circular, ellipsoid, pear shaped, a slit, or polygonal (including triangular, square, rectangular, pentagonal, hexagonal, heptagonal, and the like).

The term 'hot' in the context of hot atoms and/or hot molecules and the like, means a species having a velocity corresponding to a temperature above ambient (273 K) temperature. In an embodiment of the invention, a hot species has a velocity corresponding to a temperature of 300 K, 400 K, and 500 K.

The term 'Continuous flow' carrier gas means that the flow of the carrier gas into the discharge chamber is regulated in a constant fashion. The term 'Hybrid flow' carrier gas means that the flow of the carrier gas into the discharge chamber is pulsed on when the linear rail is moving the mesh for a measured time interval and otherwise there is no flow of the carrier gas into the discharge chamber. The term 'Pulsed flow' carrier gas means that the flow of the carrier gas into the discharge chamber is pulsed on when the linear rail is stopped for a time period and otherwise there is no flow of the carrier gas into the discharge chamber, as disclosed in U.S. patent application Ser. No. 17,266/246 to Oro et al. which is herein expressly incorporated by reference in its entirety and for all purposes.

The term 'corona discharge' means a discharge that occurs at relatively high gas pressures (e.g. at atmospheric pressure) in an electric field which is strongly non-uniform (for example by placing a thin wire inside a metal cylinder having a radius much larger than the wire). The electric field is sufficiently high to cause the ionization of the gas surrounding the wire, but not high enough to cause electrical breakdown or arcing to nearby conductor. The term 'arc discharge' means a discharge that relies on thermionic emission of electrons from the electrodes supporting the arc and that is characterized by a lower voltage than a glow discharge, but has a strong current. The term 'glow discharge' means a discharge that is produced by secondary electron emission.

The phrase 'powder sample' means a dry solid composed of many granular particles that flow freely when shaken or tilted and do not tend to form clumps except when wet. A powder sample containing an analyte includes a carrier in which an analyte has been added. A 'diluent' is a passive powder used to facilitate the transport of an analyte.

A metal comprises one or more elements consisting of lithium, beryllium, boron, carbon, nitrogen, oxygen, sodium, magnesium, aluminum, silicon, phosphorous, sulfur, potassium, calcium, scandium, titanium, vanadium, chromium, manganese, iron, cobalt, nickel, copper, zinc, gallium, germanium, arsenic, selenium, rubidium, strontium, yttrium, zirconium, niobium, molybdenum, technetium, ruthenium, rhodium, palladium, silver, cadmium, indium, tin, antimony, tellurium, cesium, barium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, polonium, francium and radium. Thus a metal includes for example, a nickel titanium alloy known as nitinol or a chromium iron alloy used to make stainless steel.

A conducting non-metal comprises carbon (including graphite and other allotropes of carbon), germanium, silicon, selenium, arsenic and antimony.

A plastic comprises one or more of polystyrene, high impact polystyrene, polypropylene, polycarbonate, low density polyethylene, high density polyethylene, polypropylene, acrylonitrile butadiene styrene, polyphenyl ether alloyed with high impact polystyrene, expanded polystyrene, polyphenylene ether and polystyrene impregnated with pentane, a blend of polyphenylene ether and polystyrene impregnated with pentane or polyethylene and polypropylene.

A polymer comprises a material synthesized from one or more reagents selected from the group comprising of styrene, propylene, carbonate, ethylene, acrylonitrile, butadiene, vinyl chloride, vinyl fluoride, ethylene terephthalate, terephthalate, dimethyl terephthalate, bis-beta-terephthalate, naphthalene dicarboxylic acid, 4-hydroxybenzoic acid, 6-hyderoxynaphthalene-2-carboxylic acid, mono ethylene glycol (1,2 ethanediol), cyclohexylene-dimethanol, 1,4-butanediol, 1,3-butanediol, polyester, cyclohexane dimethanol, terephthalic acid, isophthalic acid, methylamine, ethylamine, ethanolamine, dimethylamine, hexamthylamine diamine (hexane-1,6-diamine), pentamethylene diamine, methylethanolamine, trimethylamine, aziridine, piperidine, N-methylpiperideine, anhydrous formaldehyde, phenol, bisphenol A, cyclohexanone, trioxane, dioxolane, ethylene oxide, adipoyl chloride, adipic, adipic acid (hexanedioic acid), sebacic acid, glycolic acid, lactide, caprolactone, aminocaproic acid and or a blend of two or more materials synthesized from the polymerization of these reagents.

A plastic foam is a polymer or plastic in which a gaseous bubble is trapped including polyurethane, expanded polystyrene, phenolic foam, XPS foam and quantum foam.

A 'mesh' means one or more of two or more connected filaments, two or more connected strings, foam, perforated paper, screens, paper screens, plastic screens, fiber screens, cloth screens, polymer screens, silica screens, TEFLON® (polytetrafluoroethylene (PVDF)) screens, polymer impregnated Teflon screens, and cellulose screens. In various embodiments of the invention, a mesh includes one or more of three or more connected filaments, three or more connected strings, mesh, foam, a grid, perforated paper, screens, plastic screens, fiber screens, cloth, and polymer screens. In an embodiment of the invention, a mesh can have approximately 10 filaments per mm. In another embodiment of the invention, a mesh can have approximately 20 filaments per mm. In an additional embodiment of the invention, a mesh can have approximately 30 filaments per mm. In an alternative embodiment of the invention, a mesh can have approximately 100 filaments per mm. In designing the number of filaments per mm, approximately indicates plus or minus twenty (20) percent.

A 'conducting mesh' means a mesh able to be charged with an electrostatic charge. A 'conducting mesh' includes a mesh where at least one of the components of the mesh is a conducting metal, a conducting non-metal or a conducting salt metal.

Non-conducting perforated surfaces include plastic mesh, fabric mesh, fiberglass mesh, fiberglass, and fabricated composite materials.

A 'substratum' is a polymer, a metal, and or a plastic.

A 'grid' is a substratum in which either gaps, spaces or holes have been punched or otherwise introduced into the substratum or in which a window or section has been cut out or otherwise removed from the substratum and a mesh has been inserted into the removed window or section. In an embodiment of the invention, the grid can have a thickness between a lower limit of approximately 1 micron and an upper limit of approximately 1 cm. In this range, approximately means plus or minus twenty (20) percent.

A 'conducting grid' means a grid able to hold an electrostatic charge. A 'conducting grid' includes a grid where the substratum is a conducting metal, a conducting non-metal or a conducting salt metal.

An 'electrostatic charge' is formed when an excess or deficiency of electrons are present on a sampling substrate surface. The electrostatic charge can be formed on the sampling substrate by contacting the sampling substrate with an electrostatic charge power supply. An electrostatic charge can be used to manipulate an analyte in a non-ferromagnetic diluent as described herein. In contrast, a magnetic field used to manipulate an analyte requires a ferromagnetic diluent as disclosed in U.S. Pat. No. 8,901,488 to Musselman which is herein expressly incorporated by reference in its entirety and for all purposes.

An 'electrostatic charge power supply' means a device which generates an electrostatic charge on a sampling substrate surface. A Van der Graff generator is an example of an electrostatic charge power supply. The maximal achievable potential achievable with a Van der Graff generator is roughly equal to the sphere radius multiplied by the electric field at which a corona discharge forms.

Coronavirus disease 2019 (COVID-19) means severe acute respiratory syndrome coronavirus 2 of the genus Betacoronavirus discovered in Wuhan, China in December 2019. COVID-19 is a member of the family Coronaviridae, which are enveloped viruses that possess extraordinarily large single-stranded Ribonucleic acid (RNA) genomes ranging from 26 to 32 kB. Structural proteins found on the surface of COVID-19 play an important role in the pathogenesis and development of the disease. COVID-19 is transmitted by contact with infectious material including respiratory droplets, and can result in fever, cough, and shortness of breath and in unfavorable instances progress to pneumonia and respiratory failure.

A 'biomarker' means one or more of the following generated by or resulting from an organism: a chemical, a protein, a protein fragment, a DNA strand, a RNA strand, a DNA fragment derived from a DNA strand, a RNA fragment derived from a RNA strand, and a metabolite.

A 'respirator' means a device worn over the mouth and/or nose to prevent the inhalation of chemicals. Health care workers wear respirators to filter out virus particles as they breathe. Respirators help protect health care workers so they don't get infected with COVID-19 while helping people who have been exposed to COVID-19. A N95 respirator is a type of respirator that fits more tightly around the nose and mouth than regular medical or surgical masks. N95 filters filter out 95% of solid particles. N95 filters are not oil resistant. P95 filters resist oil exposure for up to 40 hours and filter out 95% of solid particles. P100 filters resist oil exposure for up to 40 hours and filter out 99.97% of solid particles. A powered air-purifying respirator (PAPR) covers the whole head and uses a blower to filter air. Respirators are a form of personal protective equipment (PPE). Other types of PPE health professionals wear to protect them from such hazards as COVID-19 include goggles, gloves, and gowns. 'Respiration' means the inhalation and exhalation of air, as in 'breathing'.

A 'ventilator' means a machine that helps a patient breathe by pumping oxygen into the lungs and removing carbon dioxide through a tube intubated (inserted) into a patient's trachea. COVID-19 is a respiratory disease that can cause lung inflammation and which makes breathing difficult for patients suffering from the effects of COVID-19.

The phrase 'background chemical' means a 'matrix molecule' and/or an 'introduced contaminant'.

The phrase a 'molecule of interest' or 'analyte' means any naturally occurring species (e.g., caffeine, cocaine, tetra hydro cannabinol), or synthetic molecules that have been introduced to the biological system e.g., pharmaceutical drugs (e.g., lidocaine, methadone, sildenafil, Lipitor, enalapril and derivatives thereof), and recreational drugs (e.g., morphine, heroin, methamphetamine, and the like and derivatives thereof).

The phase 'introduced contaminant' means a chemical that becomes associated with a sample during sample preparation and/or sample analysis. An introduced contaminant can be airborne or present in or on surfaces that the sample is in contact. For example, perfumes and deodorants can be associated with and analyzed during sample analysis. Alternatively, phthalates present in plastic tubes used to handle samples can leach out of the plastic tube into the sample and thereby be introduced into the sample.

The phrase an 'ion suppressor molecule' means a background chemical which suppresses ionization of a molecule of interest and/or generates a background species which ionizes to the detriment of detection of a molecule of interest.

The phrase 'background ion' or 'background species' refers to an ion formed from a background chemical. The background species can include the molecule itself, an adduct of the molecule, a fragment of the molecule or combinations thereof.

The phrase 'matrix effect' refers to the reduction in ionization of a molecule of interest due to the presence of a background species. A matrix effect is caused when a background chemical suppresses ionization of a molecule of interest and/or a background species ionizes to the detriment of a molecule of interest. Without wishing to be bound by theory, in the former case it is believed that the molecule of interest is not ionized by the presence of the background chemical. In the latter case, the resulting mass spectrum is dominated by a background species to the detriment of the analysis of the molecule of interest. The background species can be suppressing and/or masking the ionization of a molecule of interest.

The phrase 'analysis volume' refers to the aliquot of sample that is analyzed, for example applied to a mesh for analysis.

The phrase an 'ion intensifier' means a chemical that inhibits the matrix effect.

The term 'peak abundance' is the number of ions produced. The peak abundance of the protonated molecule ion of a sample is a measure of the number of intact ions of the sample produced (other processes such as cationization can also be a measure of the number of intact ions of the sample produced). The relative peak abundance of two species is the sum of the intensity corresponding to each species.

DART API CIE

DART API CIE is a method of analysis that was introduced with, for example, QuickStrip and involves presenting a series of samples deposited in individual discrete positions on a movable surface. The surface is mounted on a holder fixed to a linear rail, where the linear rail allows a constant linear motion (i.e., a fixed velocity) to present the samples as a series for analysis. The surface (typically a mesh) contains areas where sample is present and areas where the sample is not present. The linear motion thereby results in the presentation of the samples in front of a static source of ionizing species and thereby permits the scanning (and analysis) of the samples.

DART API CIE utilizes a carrier gas that generates the ionizing species which is directed at a surface (e.g., a 1536 QuickStrip mesh card). In the DART API CIE mode of operation, the carrier gas is not pulsed and therefore ionizing species are directed at the surface irrespective of whether a sample is presented to the ionizing species or not.

Helium DART

DART is another API method suitable for the analysis of analytes. Various embodiments of DART API are described in U.S. Pat. No. 7,112,785 to Laramee which is herein expressly incorporated by reference in its entirety and for all purposes, is directed to desorption ionization of molecules from surfaces, liquids and vapor using a carrier gas containing reactive species (RS). The DART API can use a large volume of carrier gas, e.g., helium is suitable although other inert gases that can generate RS can be used.

Nitrogen DART

An API can ionize analyte molecules without the use of solvents to dissolve the analyte. The ionization occurs directly from solids and liquids. Molecules present in the gas phase can also be ionized by the reactive species exiting the API. In an embodiment of the invention, the reactive species utilized can be excited nitrogen atoms or molecules. In an embodiment of the invention, the reactive species can produce long lived metastable species to impact the analyte molecules at atmospheric pressure and, e.g., to affect ionization, see also U.S. Utility patent application Ser. No. 16,422/339 entitled "APPARATUS AND METHOD FOR REDUCING MATRIX EFFECTS", inventor Brian D. Musselman, filed May 24, 2019, which is incorporated herein by reference in its entirety and for all purposes.

Gas-Ion Separator (GIS)

In various embodiments of the invention, devices and methods for transferring analyte ions desorbed from the sorbent surface using an atmospheric analyzer into the inlet of a mass spectrometer can utilize a GIS. Embodiments of this invention include devices and methods for collecting and transferring analyte ions and/or other analyte species formed within a carrier to the inlet of a mass spectrometer.

In an embodiment of the invention, one or both the inlet and the outlet GIS tubing can be made of one or more materials selected from the group consisting of stainless steel, non-magnetic stainless steel, steel, titanium, metal, flexible metal, ceramic, silica glass, plastic and flexible plastic. In an embodiment of the invention, the GIS tubing can range in length from 10 millimeters to 10 meters. In an embodiment of the invention, the GIS tubing can be made of non-woven materials. In an embodiment of the invention, the GIS tubing can be made from one or more woven materials.

In various embodiments of the invention, a GIS comprising two or more co-axial tubes with a gap between the tubes and a vacuum applied in the gap region is used to allow large volumes of carrier gas to be sampled. In various embodiments of the invention, a GIS is made up of an inlet tube and an outlet tube. In an embodiment of the invention, the proximal end of the inlet tube is closest to the sorbent surface and the distal end of the inlet tube can be some distance away from the proximal end where a vacuum can be applied. In various embodiments of the invention, the proximal end of the outlet tube is adjacent the distal end of the inlet tube and the distal end of the outlet tube enters the spectroscopy system.

Ninety Degree GIS

The use of robotic sample depositions, allows systems to deposit sub-microliter volumes of sample with precise high speed X-Y plate orientation for DART API analysis of the samples. Previously, the performance of a Ninety Degree GIS component has been compromised by high background and matrix effects. Unexpectedly, using the pulsed carrier gas source and stepping to a fixed position, the Ninety Degree GIS shows no signs of high background and matrix effects. Accordingly, the pulsed carrier gas source and stepping to a fixed position allows direct DART API with the Ninety Degree GIS analysis from higher performance robotics without the requirement for moving the sample from the sample deposition robot. Further, the Ninety Degree GIS can be combined with an extended X-Y plate with a holder that allows movement of the samples deposited onto the QuickStrip mesh through the desorption ionization region located at the distal end of the DART source such that the sample deposited onto the front side of the mesh can be vaporized and ionized in close proximity to the proximal end of the GIS positioned at the back side of the mesh. The Ninety Degree GIS can be combined with an extended X-Y plate with a holder that allows movement of the samples deposited onto the QuickStrip mesh through the desorption ionization region located at the distal end of the DART source such that the sample deposited onto the front side of the mesh can be vaporized and ionized in close proximity to the proximal end of the GIS positioned at the back side of the mesh.

API

The process of API involves the initial action of ionizing a gas by an electrical discharge. In plasma-based API, the electrical discharge of inert gases such as nitrogen, argon and helium lead to the formation of ionized gas molecules, atoms, and metastable molecules and atoms. These charged and energetic particles exit the ionization source where they interact with the molecules in air including background chemicals. Ions are formed during that interaction. Those ions are usually (i) intact protonated or deprotonated molecules such as $NO^+$, $O_2^-$, $H_3O^+$, (ii) clusters of water molecules with one proton, and (iii) ions derived from the molecules present in the ambient air including background chemicals. API becomes an analytical tool when those protonated water molecules interact with analytes present in the air resulting in transfer of the proton to the analyte. The analyte can enter the ionizing species by introduction of the analyte as a gas, liquid or solid, positioned in the path of the products of the electrical discharge of the gas. Two forms of API are Atmospheric Pressure Chemical Ionization (APCI) using an electrical discharge between a high voltage needle and a surface to which the sample has been applied, and Direct Analysis in Real Time (DART) using an electrical discharge and heated gas which desorbs the sample from a surface into the atmosphere (DART API). In absence of a sample, the molecules present in the ambient air become ionized and when detected generate a mass spectrum.

In many cases the purposeful introduction of a sample into the ionizing species results in formation of an ion that is easily measured by using a spectrometer positioned in close proximity to the site of the API.

In the case of biological samples certain molecules present possess very high proton affinity meaning that their purposeful introduction into the ionizing species results in their ionization and formation of ionized dimers containing two of the molecules and a proton. High proton affinity molecule can also combine with another molecule or some closely related molecule forming a mixed dimer or tetramer in the protonated form. The affinity for these molecules for protons prohibits the use of the ionizing method as an analytical method since other molecule of interest in the sample cannot remain un-ionized and are thus not detected using a spectrometer positioned in close proximity to the site of the API. In the API experiments the domination of the resulting spectra by one molecule or collection of high proton affinity molecules is commonly identified as an experiment where the matrix effect is present.

Matrix Assisted Laser Desorption (MALDI-TOFMS) is an analytical instrument useful for the detection of biomolecules present in bacteria, viruses, RNA fragments, DNA fragments and other biological materials the presence of which can permit confirmation of the identity of the biological material or its origin.

Atmospheric Pressure MALDI MS is an analytical instrument with capabilities of the MALDI-TOF but without requirement for positioning the sample inside the high vacuum region of a mass spectrometer.

Collection of trace evidence at crime scenes is a complex activity involving multiple activities ranging from inspection to identify the trace to be collected, photography to document its place and time of the collection and use of specialized tools and containers to collect, transport and store the materials in preparation for their display at trial or further analysis post-crime. Drugs of abuse are often seized during its transport or a point-of-sale when those materials are presented in a wide variety of in packaging. More recently reports of law enforcement officers being exposed to life threatening chemicals during the collection and transport of those drugs interest had grown in the potential for non-contact sampling and analysis of these materials which may or may not be drugs at all. Field-based analysis of drugs present as powders is facilitated by the use of colorimetric test. Those test involve the transferring a small amount of the seized powder or liquid into a container where a chemical interaction between the sample and chemicals in the test solution produces a visible color change as an indication of presence of a narcotic. Laboratory based testing if typically completed in order to confirm the results of the colorimetric or other so called screening test. Both screening and laboratory test incorporate a step where the sample of interest must be physically transferred to the container by physical contact between the sample and a tool manipulated by the personnel administering test. In the case of field test the danger of exposure is high. In the laboratory test significant safety measures are taken during sample handling. Specialized equipment with disposable containers and use of organic solvent which have a negative impact on the environment are increasing the cost of operation at a time when the demand for more extensive testing to prove guilt is rising. It is for example, no longer considered acceptable to mix samples from separate containers together in order to reduce the testing cost and therefore is 100 samples are seized then 100 samples need to be analyzed in order to demonstrate a preponderance of evidence that the drug was present whether or not the samples were 1 kilogram or 100 milligrams each. Therefore methods to streamline the collection of evidence and enabling more efficient sample processing while reducing operating expense might be desirable.

The collection of dust prints at a crime scene is facilitated by devices designed to transfer the dust from surfaces using an electrostatic field to charge and collect the dust on metalized sheets. The dust print image is photographed at the scene for cataloging, transporting, storage and subsequent analysis in the forensic laboratory. The application of this dust collection method to the transfer of chemicals from a surface or container has been enabled here by using those same Electro Static field Generators (ESG). In utilizing the ESG and in order to avoid the tedious practice of removing the chemicals from the metalized sheets a perforate collector sheet has been placed between the metalized sheet and the surface containing the substances of interest. Unlike traditional ESG use, a gap is introduced in order to separate the metalize sheet and perforated collector assembly from the sample surface in to facilitate non-contact transfer of the substance of interest onto the perforated sheet which is designed to permit for either chemical analysis or detection of biological organisms using appropriate analytical instrumentation.

In this invention the use of the electrostatic print lifter device 101 for collection of chemicals for direct analysis is enabled by the substitution of a perforated sampling surface 125 between the surface 158 onto which the chemical is present and the conducting plastic 112. The pre-treatment of that perforated surface 125 with a chemical having limited volatility enables retention and concentration of the evidence on the perforated surface. Analysis of the perforated sampling surface 125 once laden with sample is then completed in the field by using ambient ionization methods or in the laboratory by using any one or more of a number of analytical instruments.

Previously, collection of loose powders at a crime scene for purposes of securing evidence involves physical collection of the powders by use of a vacuum device to suction the powder onto a filter from which it can be removed and deposited into a container for cataloging, transporting, storage and subsequent analysis in the forensic laboratory. These collection methods involve physical contact between the evidence and the filter or other collection devices and subsequent transfer of that evidence to appropriate analytical instrumentation for analysis. Further, those processes can be laborious and time consuming.

In an embodiment of the present invention, a Van de Graff generator 102 which does not have an external ground electrode can be used to 'charge transfer' a sample. The collection of substances for direct analysis is enabled by positioning a perforated sampling surface between the surface upon which the evidence/sample is present and the Van de Graff generator conducting plastic. Pre-treatment of that perforated surface with an individual chemical or mixture of chemicals having limited volatility enables retention and concentration of the evidence on the perforated surface. In an alternative configuration, a conducting plastic strip is inserted between the Van de Graff generator and the pre-treated perforated surface in order to permit use of non-conducting perforated surface for sample collection. In each configuration analysis of the perforated sample laden surface is then completed in the field by using ambient ionization methods or in the laboratory by using any of a number of analytical instruments.

In an embodiment of the present invention, the sample on the surface is in powder form having previously been pulverized in preparation for analysis. The powder may be derived from a larger object such as a pharmaceutical tablet, seeds, food products, and commercial goods having properties that permit their fracture into sufficiently small fragments that static electricity can cause their movement from the surface upon which they are at rest towards the electrically charged conducting plastic.

In an embodiment of the invention the perforated surface positioned between the surface upon which the sample is presented and the conducting plastic sheet to which the high voltage is applied is composed of a mesh or a grid. In various embodiments of the invention, the surface is a metal mesh, a metal grid, a metalized plastic mesh, or a metalized plastic grid. In various embodiments of the invention, the plastic of the metalized plastic mesh or the metalized plastic grid is a hard plastic or a soft plastic. In various embodiments of the invention, the surface is a cellulose mesh. In other embodiments of the invention, the surface is a woven fabric.

In an embodiment of the invention the perforated surface positioned between the surface upon which the sample is presented and the conducting plastic sheet to which the high voltage is applied is not in contact with the surface upon which the sample is presented in order to effect non-contact sampling from that surface.

In an embodiment of the invention the conducting plastic sheet to which the high voltage is applied is attached to a roller to permit sampling from a large surface area. The perforated surface is configured to cover the conducting plastic sheet. The collection of sample is completed by moving the roller surface across the surface upon which the sample is presented in order to permit the collection of a substance from a wider surface area. In an alternative configuration the surface of the perforated pretreated sheet is separated from the sampling surface by physical standoffs to permit non-contact sampling.

In an embodiment of the invention the conducting plastic sheet to which the high voltage is applied is attached to a non-conducting ticket or card having a portion of which is a pretreated perforated conducting surface where a three dimensional object can be positioned such that the perforated sheet is in contact with the conducting plastic sheet where substances on the surface of the three dimensional object can be transferred to the ticket for analysis. In an alternate configuration where the portion of the card includes a pretreated perforated conducting surface the high voltage can be applied directly to the conducting surface without requirement for the conducting plastic sheet.

In an embodiment of the invention an electrostatic charge is applied to a single or array of conducting pins generating a electrostatic charge where the distal end of the pin is positioned in close proximity to a grounded surface upon which samples of interest are present. The pin surface is pre-treated to permit retention of sample collected from the surface. In an alternative experiment the sample surface may be a movable surface positioned in close proximity to the distal end of the pin to permit sampling of a wider surface area in a non-contact manner. In both experiments the pin or array of pins can be moved by manual or robotic means to a position where the distal ends of each pin is presented for direct analysis. Alternatively, the pins may be processed to remove the sample from its surface by using solvents, or aqueous solutions in order to permit chemical analysis of those chemicals.

In an embodiment of the invention an electrostatic charge is applied to a single or array of conducting pins generating a electrostatic charge where the distal end of the pin is positioned in close proximity to a grounded surface upon which samples of interest are present. The pin surface is pre-treated to permit retention of sample collected from the surface. In an alternative experiment the pin or array of pins may be moved along a surface with the distal end of the pin or pins positioned in close proximity to the sample in order to permit sampling from a wider surface area in a non-contact manner. In an alternative experiment where the surface upon which sample is present is non-conducting the pin or array of pins can be moved by manual or robotic means to a position where the distal ends of each pin is in contact with the sample surface.

In an embodiment of the invention an ESG can be configured to enable collection of powders from a variety of porous and non-porous surfaces including horizontal, vertical or curved surfaces. The ESP device presents capability to lift powder off of floors, carpet, upholstery, and even human skin.

Flowing Gases

Commercial air cleaners utilize static electricity to extract dust from air as it moves through the cleaner unit. The presence of chemicals in the air can be indicative of air quality with certain chemicals being of interest in environmental studies. Columns of air can be generated by action of a vacuum pump, or by pressurization of the air and its discharge to a lower pressure area. Human breath can be discharged through an air cleaner in order to isolate certain molecules although such headspace studies often involve collection of vapors rather than substances such as microorganisms, bacteria, or viral particles. As bacteria and virus are often exhaled as a consequence of a cough or sneeze and those particles may immediately become associated with dust or other particulates in the air an air purifier should be capable to collect those particles under normal operating conditions. Dust collected by using an array of conducting pins enclosed in a pipe or box through which the breath is passed when activated by application of a high voltage to the array might prove viable for extraction of a viral particle (virion), a viral envelope, a viral coat protein, bacteria, a bacterial cell envelope or a bacterial cell membrane. Utilizing an ambient ionization source equipped mass detector to identify certain chemical or biomarker compounds that are known to be present in a virus particle or on the cell surface of bacteria can be used as a first pass inspection for their presence. In the case of an RNA based virus, detection of individual RNA bases or portions of RNA, such as RNA dinucleotides can prove suitable as a presumptive test for the presence of a RNA virus. As those molecules would not normally be present on, for example, a cardboard box used in shipping or a postal letter, their detection can be viewed as a warning sign for the presence of a virion, either accidental or intentional (bioterror). In an embodiment of the invention, an array of charged pins in enclosed in a container through which an individual can breathe. The breathing causes the transfer of virus particles into the container where electrostatic forces result in their transfer to the surface of the collection pins. Transfer of the collection pins to the analytical instrument completes the analysis.

In an embodiment of the invention, electrodes of opposite charge are configured to create a static field in a container thorough which an individual can breathe. The individual breathing causes movement of virus particles into that container where electrostatic forces result in their transfer to the surface of the electrodes. The electrodes may be present as a collection of metal pins, an array of metal pins, a single conducting plastic sheet, an array of conducting plastic strips or a combination of any of these materials which results in generation of a static electric field when exposed to high voltage. The surface of the electrodes can be covered with a pre-treated screen to increase the efficiency of contaminant collection.

In an embodiment of the invention electrodes of opposite charge are configured to create a static field in a container thorough which an individual can breathe. A pretreated perforated surface is applied over the electrodes. The individual breathing causes movement of virus particles into that container where electrostatic forces result in their transfer to the surface of pretreated surface.

In an embodiment of the invention a container though which an individual can breath is attached to the air intake port of a respirator in order to collect particles from air passing through the container as the respirator wearer breathes. In an embodiment of the invention, the container includes a collector to collect particles as the respirator wearer breathes. In an embodiment of the invention, the a collector is made up of electrodes. In an alternative embodiment of the invention, the container includes a pre-treated mesh configured between the open volume of the collector. Application of an electrostaic charge transfers the particles from the collector to pre-treated mesh. In an alternative embodiment of the invention, container can be accessed and the mesh can be positioned for transfer of the particles to the mesh. In an embodiment of the invention, the container can be accessed and the mesh can be positioned for transfer of the particles to the mesh in a source to thereafter allow the ionizing gas in order to permit detection of chemicals present on the mesh. In an alternate configuration the mesh may be removable in order to permit movement of the mesh to where it can be positioned in the direct analysis ionizing gas in order to permit detection of chemicals present on the mesh expanding on the configuration of the collector. In this configuration the respirator can be worn continuously without interruption by replacement of the container with another container. Analysis of the mesh to detect biomarkers can be used to assess the presence of disease/contaminants in the ambient air. Those contaminants may be organisms or chemicals in nature.

In an embodiment of the invention the electrostatic field enabled container though which an individual can breath is attached to a respirator in order to collect particles from breath as it passes through the collector as the respirator wearer breathes. A pre-treated mesh is configured between the open volume of the collector through which air is passing and the electrodes in the container in order to collect the particles. The mesh is either permanently fixed in which case after use by respirator wearer the container can be opened and the mesh positioned in the direct analysis ionizing gas in order to permit detection of chemicals present on the mesh. In an alternate configuration the mesh may be removable in order to permit movement of the mesh to where it can be positioned in the direct analysis ionizing gas in order to permit detection of chemicals present on the mesh expanding on the configuration of the collector. In this configuration the respirator can be worn continuously without interruption by replacement of the mesh with another mesh. Analysis of the mesh to detect biomarkers can be used to assess the presence of contaminants being exhaled by the wearer. Those contaminants can be organisms or chemicals in nature.

In an embodiment of the invention the mesh utilized for collection of the contaminants can be removed from the collector and placed in a culture medium in order to facilitate the identification of the contaminant. Post-culture and upon formation of discernable colonies or copies of organisms ambient ionization methods including direct analysis with ionizing gas or atmospheric pressure matrix assisted laser desorption ionization mass spectrometry can be used to permit positive identification of bacteria, virus or other organisms that may or may not be a threat to life by using biomarkers linked to those organisms.

In an embodiment of the invention the electrostatic field enabled container though which an individual can breath is attached to the air intake port of a ventilator in order to collect particles from air passing through the collector as the respirator wearer breathes. A pre-treated mesh is configurated between the open volume of the collector through which air is passing and the electrodes in the container in order to collect the particles. The mesh is either permanently fixed in which case after use by ventilator user the container can be opened and the mesh positioned in the direct analysis ionizing gas in order to permit detection of chemicals present on the mesh. In an alternate configuration the mesh may be removable in order to permit movement of the mesh to where it can be positioned in the direct analysis ionizing gas in order to permit detection of chemicals present on the mesh expanding on the configuration of the collector. In this configuration the respirator can be worn continuously without interruption by replacement of the mesh with another mesh. Analysis of the mesh to detect biomarkers, can be used to assess the presence of contaminants in the ambient air. Those contaminants may be organisms or chemicals in nature.

In an embodiment of the invention the electrostatic field enabled container is attached to the exhalation port of a ventilator in order to collect particles exiting the user in their breath as it passes into and through the collector. A pre-treated mesh is configurated between the open volume of the collector through which air is passing and the electrodes in the container in order to collect the particles. The mesh is either permanently fixed in which case after use by respirator wearer the container can be opened and the mesh positioned in the direct analysis ionizing gas in order to permit detection of chemicals present on the mesh. In an alternate configuration the mesh may be removable in order to permit movement of the mesh to where it can be positioned in the direct analysis ionizing gas in order to permit detection of chemicals present on the mesh expanding on the configuration of the collector. In this configuration the ventilator can be used continuously without interruption by replacement of the mesh with another mesh. Analysis of the mesh to detect biomarkers, can be used to assess the presence of contaminants being exhaled by the wearer. Those contaminants may be organisms or chemicals in nature.

Figures 6A, 6B:
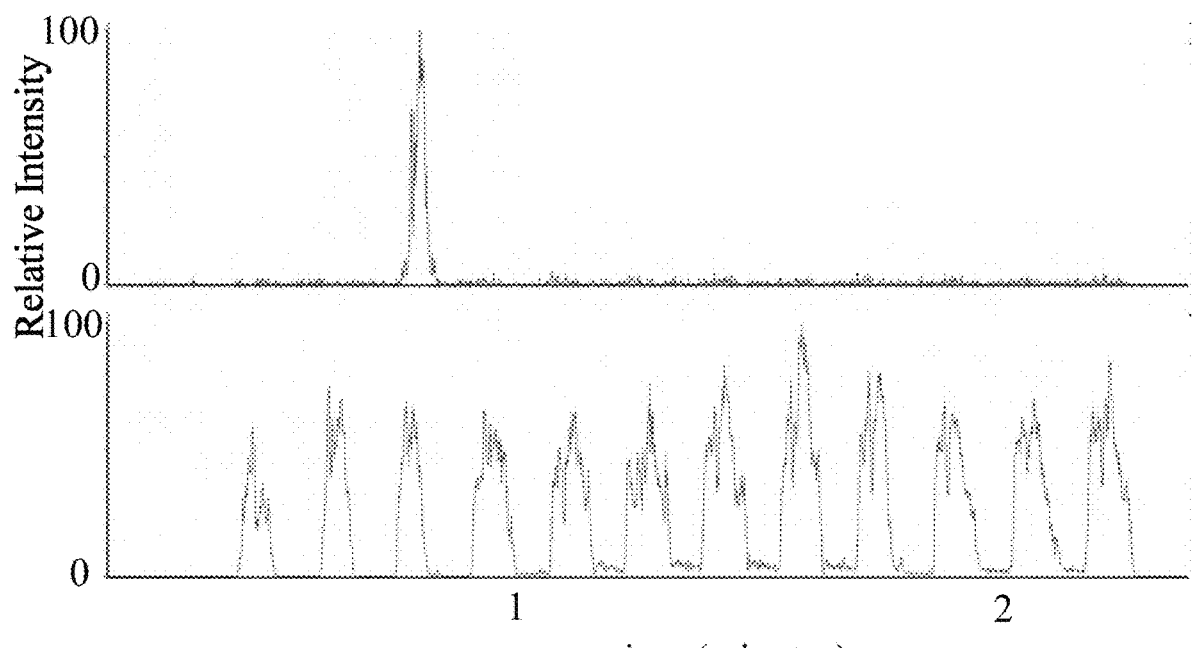
FIG. 6A shows the EIC for m/z 179.2 (caffeic acid [M−H]$^−$) resulting from the analysis of gallic acid (in 12 individual wells) and caffeic acid (in well 3) deposited in individual wells of a 384 well plate and transferred with an electrostatic charge to a wire mesh surface analyzed with DART MS, according to an embodiment of the invention.
FIG. 6B shows the EIC for m/z 169.2 (gallic acid [M−H]$^−$) resulting from the analysis of gallic acid (in 12 individual wells) and caffeic acid (in well 3) deposited in individual wells of a 384 well plate and transferred with an electrostatic charge to a wire mesh surface analyzed with DART MS, according to an embodiment of the invention.

In an embodiment of the invention the electrostatic field enabled container with its pre-treated mesh collector may be positioned between the counter of a continuous flow condensing nucleus counter (CNC) and its exit pump port. In this configuration the CNC facilitates growth of the particles exiting either the ventilator or respirator where the particle growth permits a more accurate count of the number of particles. The utility of knowing the particle count entering the electrostatic field container may be used as an indicator that sufficient particles have entered the collector to warrant the direct analysis measurement of the contaminant. In an alternative configuration of the invention a second pretreated mesh may be positioned between the particle counting detector of the CNC and its outlet port in-line in order to capture particles that are to small to be influenced by the static electric field for their direct measurement where the addition of the exit port pump may increase the velocity of the particles to a greater extent than the velocity imparted by normal exhalation.

In an embodiment of the invention, a method of collection of a chemical for analysis can be transferred from individual wells of a 96, 384 or a 1536 well plate to an analysis surface using an electrostatic charge. As an example of the method, a mixture of oxycodone and acetaminophen powders are deposited in odd numbered wells 125 while even numbered wells 115 of row 'I' and the remainder of the wells 115 of a 384 well plate 110 remain empty, see FIG. 2A. In the example, wire mesh pretreated with a solution of 50% glycerin in methanol 252 is located in a holder 250 which is positioned longitudinally along row 'I' of the 384 well plate 110 covering each of row 'I's 24 wells (of which 12 wells are loaded with oxycodone and acetaminophen powder), see FIG. 2B. A strip of Mylar®, a metalized plastic 256, is positioned on top of the wire mesh surface 252 and the 384 well plate 110, ee FIG. 2C. A metal plate 358 is positioned on top of the metalized plastic 256, see FIG. 2D. A high voltage power supply 360 is positioned such that one of its electrodes is in contact with the metalized plastic 256 and the other of its electrodes is in contact with earth ground 368, see FIG. 2E. The power supply 360 is energized 362 to generate the high voltage 364 and after a short time interval the power supply 360 is turned off. The wire mesh strip 252 is moved to the analytical instrument where it is positioned for chemical analysis (data not shown).

In an alternative embodiment of the invention, the sampling surface can be a series of metal pins held in a linear strip with a non-conducting handle positioned such that the pins are in close proximity but not touching the well plate. FIG. 3A shows a handle 330 of a holder 325 to which a series of pins 320 are inserted and positioned above a 96 well 315 plate 310. FIG. 3B shows a hand held high voltage power supply 472 positioned using a hand grasp 474 such that it is in contact with the handle 330 of the holder 325 to which a series of pins 320 are inserted positioned above a 96 well 315 plate 310, (see FIG. 3A). FIG. 3C shows a hand held high voltage power supply 472 positioned such that it is in contact with top of a wire mesh surface 252 positioned on top of a holder 574 which is placed on top of the cellulose surface 585.

The 96 well plate prepared for transfer to wire mesh (as shown in FIG. 2A) was first used to transfer oxycodone (oxycodone was not added to well 3) and acetaminophen (added to all wells) to the pin tool. In this example, the wire pins were pretreated with a solution of 20% glycerin in methanol, where the pin tool was located in a holder which is positioned longitudinally along row 'I' of the 384 well plate where each pin was located above each of row 'I's 24 wells. The pin holder and pins were then analyzed with DART MS (see FIG. 1B). The results of the positive ion analysis are shown in FIGS. 4A-4B. FIG. 4A shows the Extracted Ion Current (EIC) for m/z 152.2 (acetaminophen $[M+H]^+$) resulting from the analysis of oxycodone and acetaminophen deposited in 5 individual wells of the 96 well plate and transferred with an electrostatic charge to a wire mesh surface analyzed with DART MS. FIG. 4B shows the EIC for m/z 315.4 (oxycodone $[M+H]^+$) resulting from the analysis of oxycodone and acetaminophen deposited in 5 individual wells of a 96 well plate and transferred with an electrostatic charge to a wire mesh surface analyzed with DART MS.

Unexpectedly, in an embodiment of the invention a method of collection of oxycodone and dextromethorphan for analysis without cross contamination can be demonstrated by depositing oxycodone and dextromethorphan powder into individual wells of one row of a 384 well plate where the powder is transferred to an analysis surface using an electrostatic charge. The 384 well plate is utilized to create greater separation between the chemicals during the collection onto the wire mesh. In an embodiment of the invention, the sampling surface can be a wire mesh pretreated with a solution of 20% glycerin in methanol positioned longitudinally along a row of the well plate covering each of the 24 wells. A strip of metalized plastic can be positioned on top of the wire mesh surface. A high voltage power supply can be positioned such that one of its electrodes is in contact with the metalized plastic and the other of its electrodes is in contact with earth ground. The power supply can be energized to generate the high voltage and after a short time interval the power supply can be turned off. The wire mesh strip can be moved to the analytical instrument where it can be positioned for positive ion chemical analysis. Results of such an analysis are shown in FIGS. 5A-5B. FIG. 5A shows the EIC for m/z 315.4 (oxycodone $[M+H]^+$) resulting from the analysis of oxycodone and dextromethorphan deposited in 5 of 10 individual wells of a 384 well plate and transferred with an electrostatic charge to a wire mesh surface analyzed with DART MS. FIG. 5B shows the EIC for m/z 272.4 (dextromethorphan $[M+H]^+$) resulting from the analysis of oxycodone and dextromethorphan deposited in 5 of 10 individual wells of a 384 well plate and transferred with an electrostatic charge to a wire mesh surface analyzed with DART MS. In an alternative embodiment of the invention, a 1536 well plate may be used to enable analysis of even smaller volumes of powder.

In an embodiment of the invention, a method of collection of gallic acid and caffeic acid can be demonstrated by depositing gallic acid and caffeic acid powder into individual wells of one row of a 384 well plate. In an embodiment of the invention, the sampling surface can be a wire mesh pretreated with a solution of 2% mineral oil in toluene positioned longitudinally along a row of the well plate covering each of its 24 wells. A Van de Graff generator can be positioned above the pretreated wire mesh surface and can contact with the mesh. A high voltage field emanating form the Van de Graff generator in the on cycle enables transferring of the gallic acid and caffeic acid from the well plate onto the pretreated wire mesh. Analysis can be completed by moving the wire mesh strip to the analytical instrument where it can be positioned for negative ion chemical analysis as shown in FIGS. 6A-6B. FIG. 6A shows the EIC for m/z 179.2 (caffeic acid [M–H]$^-$) resulting from the analysis of gallic acid (in 12 individual wells) and caffeic acid (in well 3) deposited in individual wells of a 384 well plate and transferred with an electrostatic charge to a wire mesh surface analyzed with DART MS. FIG. 6B shows the EIC for m/z 169.2 (gallic acid [M–H]$^-$) resulting from the analysis of gallic acid (in 12 individual wells) and caffeic acid (in well 3) deposited in individual wells of a 384 well plate and transferred with an electrostatic charge to a wire mesh surface analyzed with DART MS.

Figure 7A:
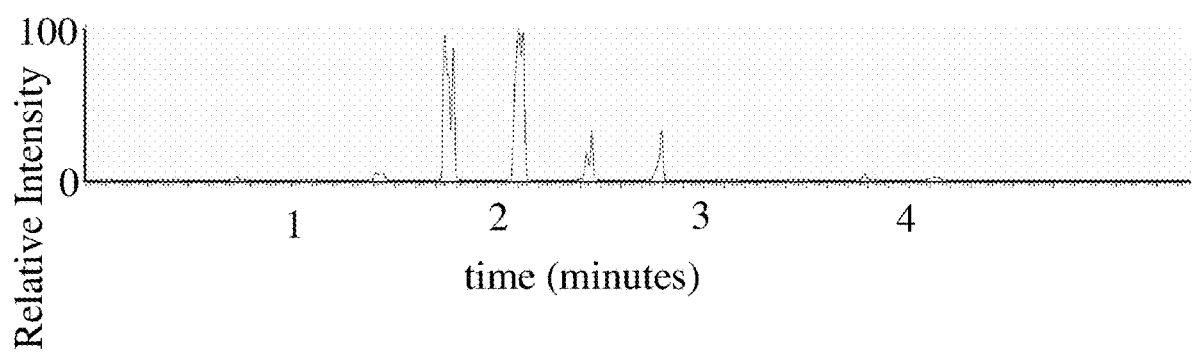
FIG. 7A shows the EIC for m/z 284.2 (Guanosine [M+H]$^+$) resulting from the analysis of a mixture containing Uridine (U), Cytidine (C), Guanosine (G) and Adenosine (A) deposited in individual wells of a 384 well plate and transferred with an electrostatic charge to a wire mesh surface analyzed with DART MS, according to an embodiment of the invention.
Figure 7B:
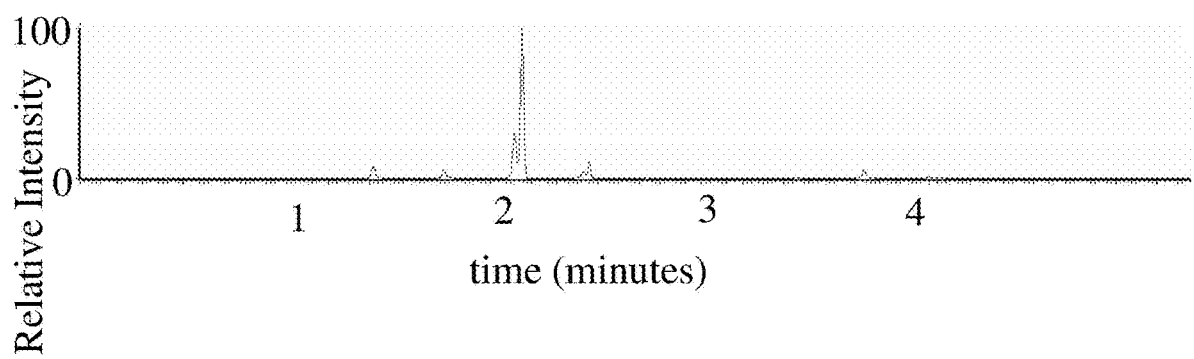
FIG. 7B shows the EIC for m/z 268.2 (Adenosine [M+H]$^+$) resulting from the analysis of a mixture of U, C, G and A deposited in individual wells of a 384 well plate and transferred with an electrostatic charge to a wire mesh surface analyzed with DART MS, according to an embodiment of the invention.
Figure 7C:
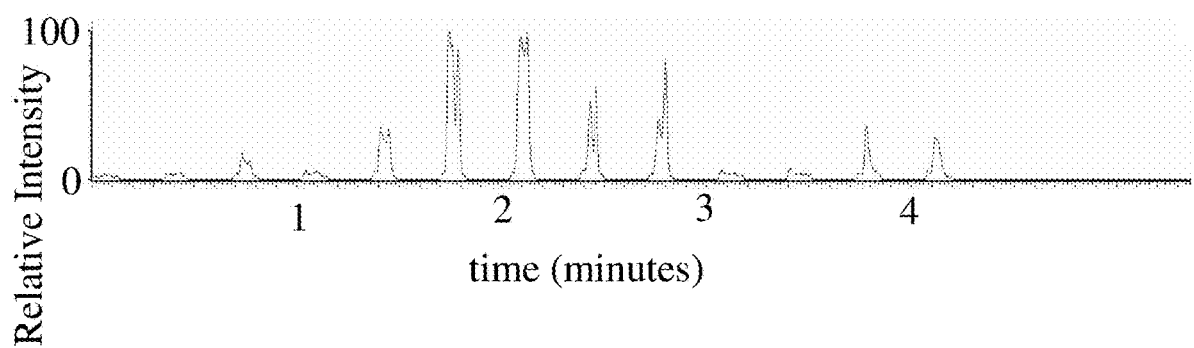
FIG. 7C shows the EIC for m/z 245.2 (Uridine [M+H]$^+$) resulting from the analysis of a mixture of U, C, G and A deposited in individual wells of a 384 well plate and transferred with an electrostatic charge to a wire mesh surface analyzed with DART MS, according to an embodiment of the invention.
Figure 7D:
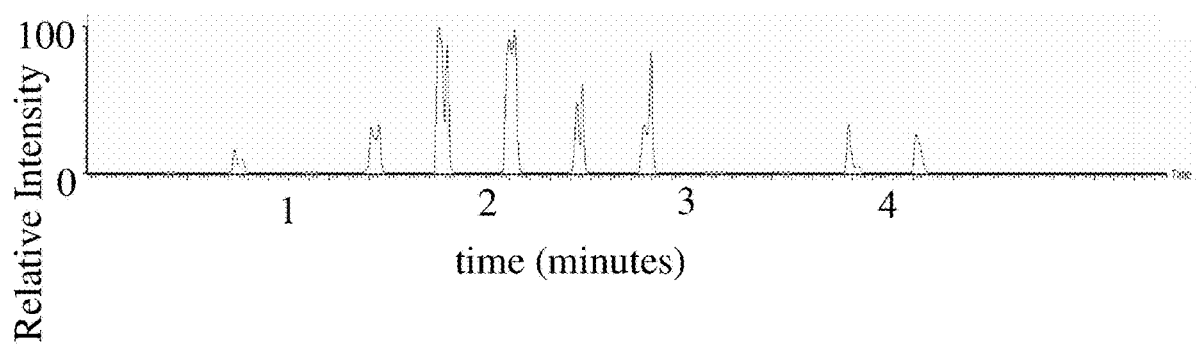
FIG. 7D shows the EIC for m/z 244.2 (Cytidine [M+H]$^+$) resulting from the analysis of a mixture containing U, C, G and A deposited in individual wells of a 384 well plate and transferred with an electrostatic charge to a wire mesh surface analyzed with DART MS, according to an embodiment of the invention.

In an embodiment of the invention, a method of collection of Uridine (U), Cytidine (C), Guanosine (G) and Adensine (A) can be demonstrated by depositing a mixture of U, C, G and A into the individual wells of one row of a 384 well plate. In an embodiment of the invention, the sampling surface can be a wire mesh surface positioned longitudinally along the row of the well plate covering each of its 12 wells. A Van de Graff generator can be activated and a high voltage can be applied to the metal pins by touching of the generator output electrodes to the handle or any component of the pin assembly for a short time interval. The power can then be turned off. The metal pins can be moved to the analytical instrument where it is positioned for chemical analysis. The results of this positive ion analysis are shown in FIGS. 7A-7D. FIG. 7A shows the EIC for m/z 284.2 (Guanosine [M+H]$^+$) resulting from the analysis of a mixture containing Uridine (U), Cytidine (C), Guanosine (G) and Adensine (A) deposited in individual wells of a 384 well plate and transferred with an electrostatic charge to a wire mesh surface analyzed with DART MS. FIG. 7B shows the EIC for m/z 268.2 (Adenosine [M+H]$^+$) resulting from the analysis of a mixture of U, C, G and A deposited in individual wells of a 384 well plate and transferred with an electrostatic charge to a wire mesh surface analyzed with DART MS. FIG. 7C shows the EIC for m/z 245.2 (Uridine [M+H]$^+$) resulting from the analysis of a mixture of U, C, G and A deposited in individual wells of a 384 well plate and transferred with an electrostatic charge to a wire mesh surface analyzed with DART MS. FIG. 7D shows the EIC for m/z 244.2 (Cytidine [M+H]$^+$) resulting from the analysis of a mixture containing U, C, G and A deposited in individual wells of a 384 well plate and transferred with an electrostatic charge to a wire mesh surface analyzed with DART MS.

Figure 3A:
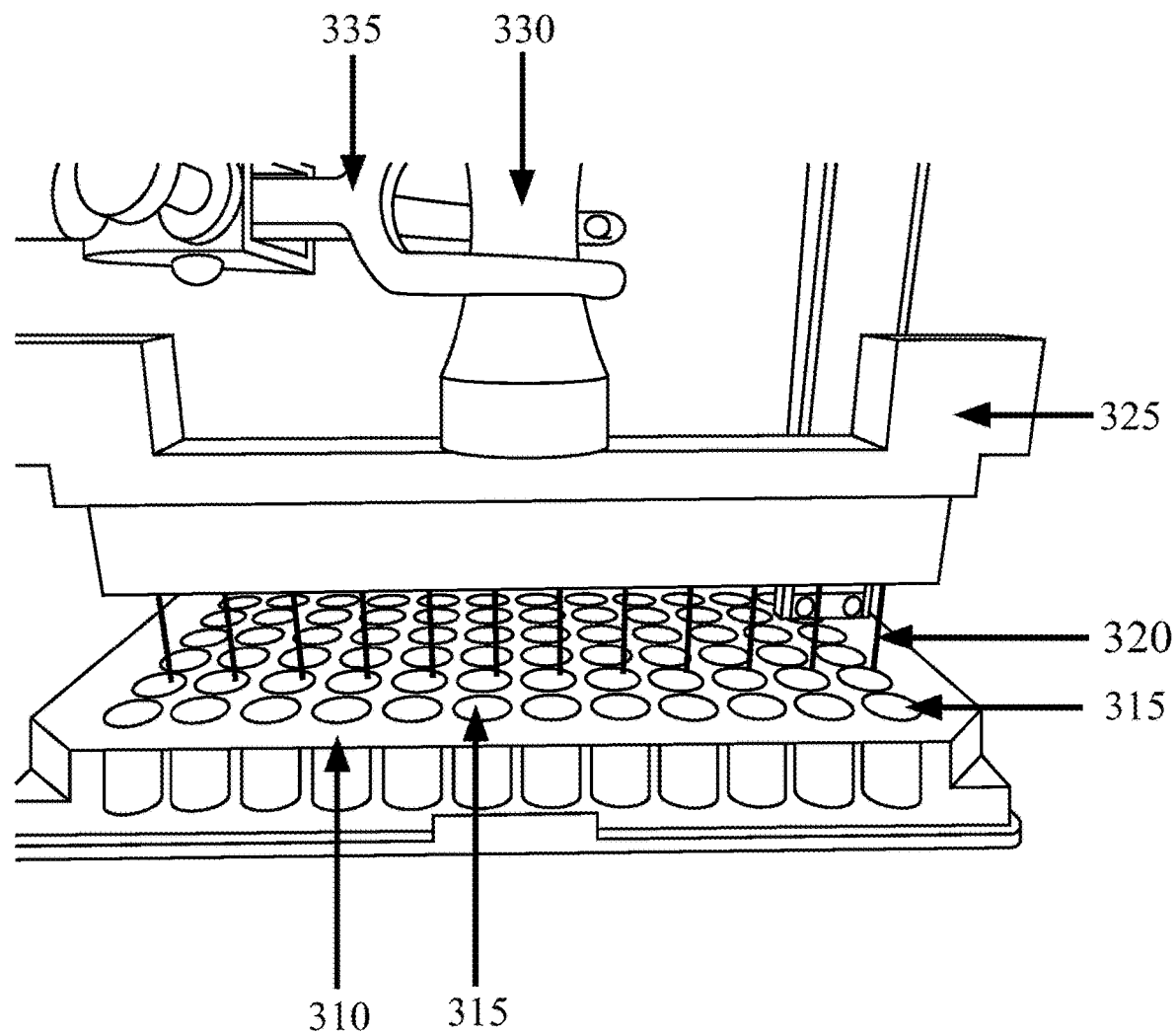
FIG. 3A shows a handle 330 of a holder 325 to which a series of pins 320 are inserted and positioned above a 96 well 315 plate 310, according to an embodiment of the invention.
Figure 3B:
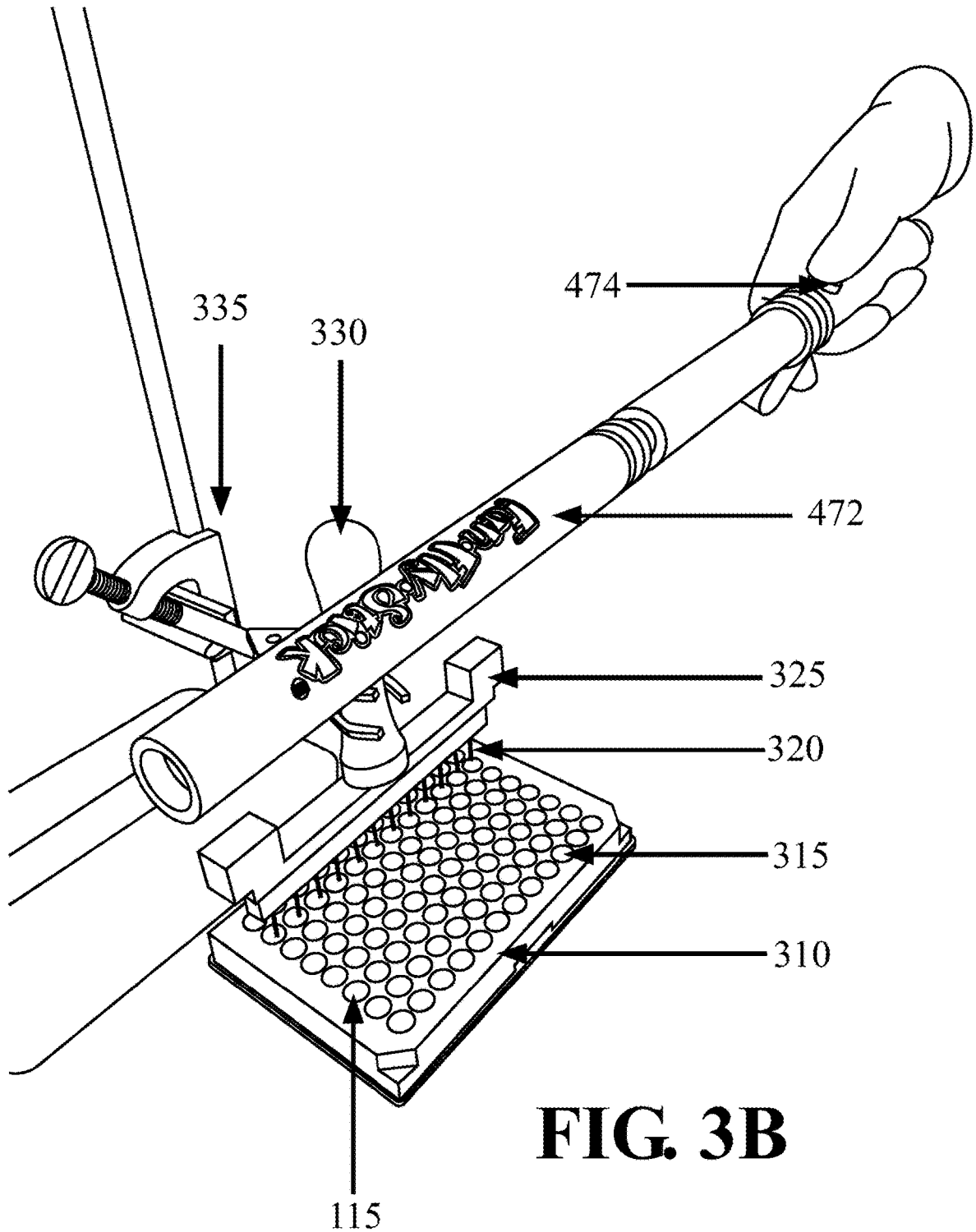
FIG. 3B shows a hand held high voltage power supply 472 positioned using a hand grasp 474 such that it is in contact with the handle 330 of the holder 325 to which a series of pins 320 are inserted positioned above a 96 well 315 plate 310, (see FIG. 3A), according to an embodiment of the invention.
Figure 3C:
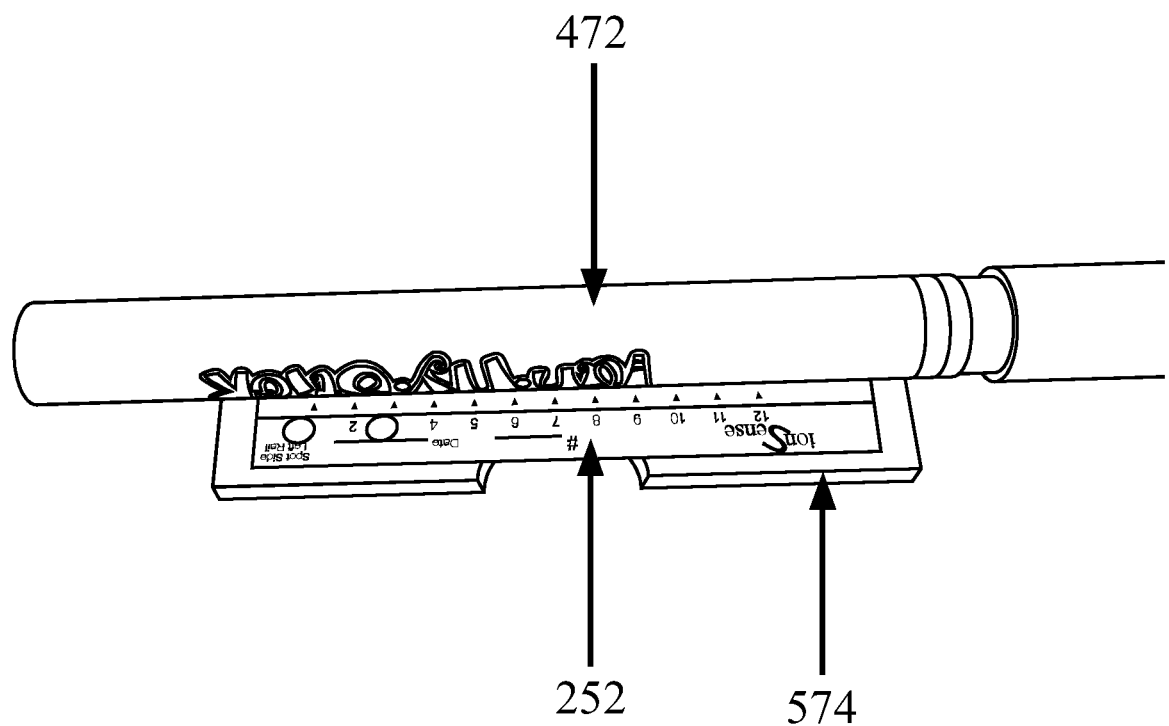
FIG. 3C shows a hand held high voltage power supply 472 positioned such that it is in contact with top of a wire mesh surface 252 positioned on top of a cellulose surface 574, according to an embodiment of the invention.
Figures 4A, 4B:
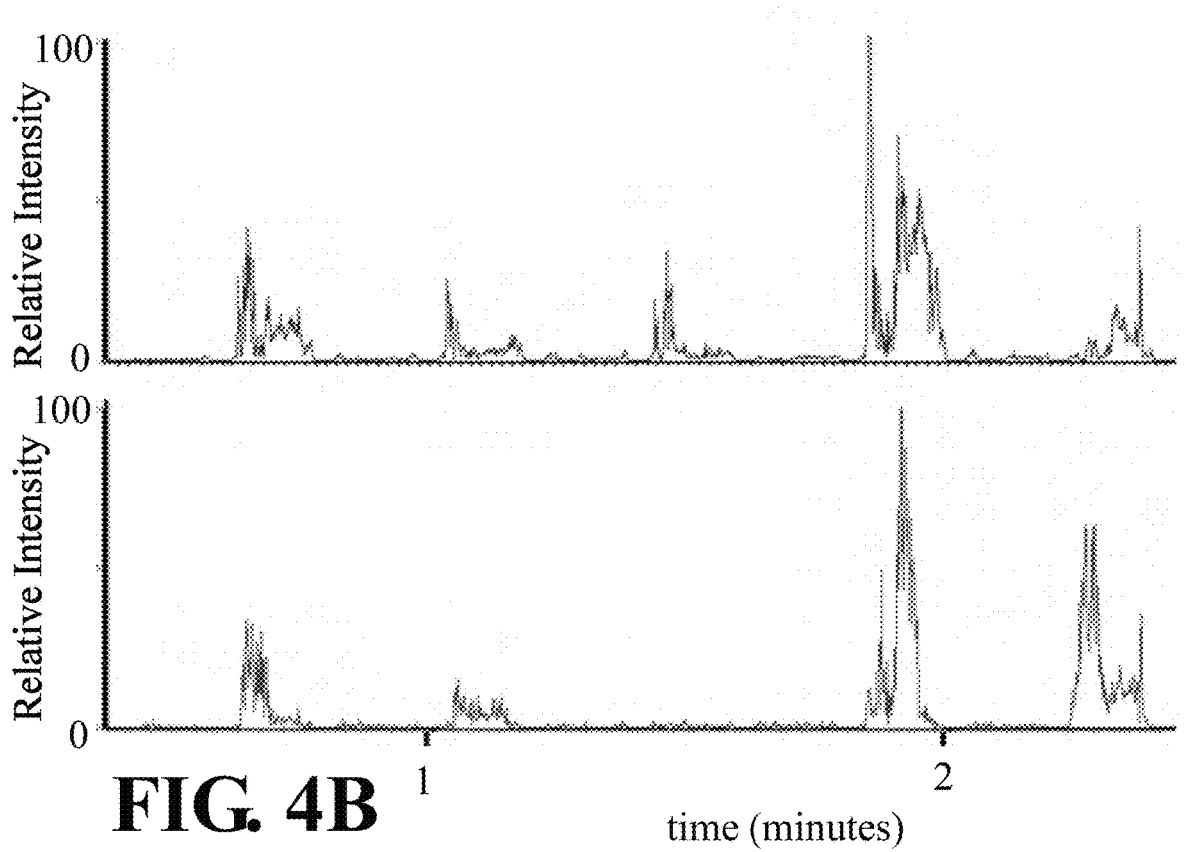
FIG. 4A shows the Extracted Ion Current (EIC) for m/z 152.2 (acetaminophen [M+H]$^+$) resulting from the analysis of oxycodone and acetaminophen deposited in 5 individual wells of a 96 well plate (oxycodone is not added to well 3) and transferred with an electrostatic charge to a wire mesh surface analyzed with DART MS, according to an embodiment of the invention.
FIG. 4B shows the EIC for m/z 315.4 (oxycodone [M+H]$^+$) resulting from the analysis of oxycodone and acetaminophen deposited in 5 individual wells of a 96 well plate (oxycodone is not added to well 3) and transferred with an electrostatic charge to a wire mesh surface analyzed with DART MS, according to an embodiment of the invention.
Figure 8A:
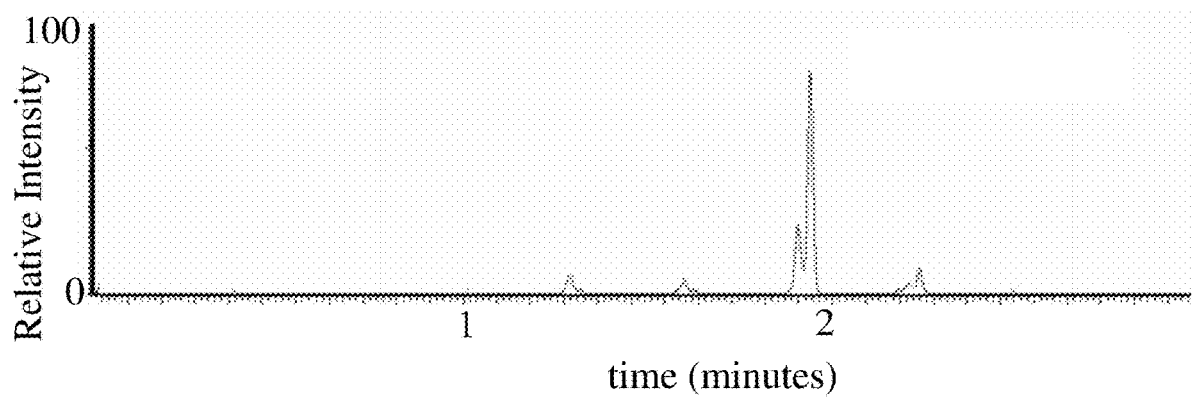
FIG. 8A shows the EIC for m/z 268.1 (Adenosine [M+H]$^+$) resulting from the analysis of a mixture containing nitrogenous bases uracil and cytosine and nucleosides A and G deposited on a cellulose surface and transferred to a wire mesh surface analyzed with DART MS, according to an embodiment of the invention.
Figure 8B:
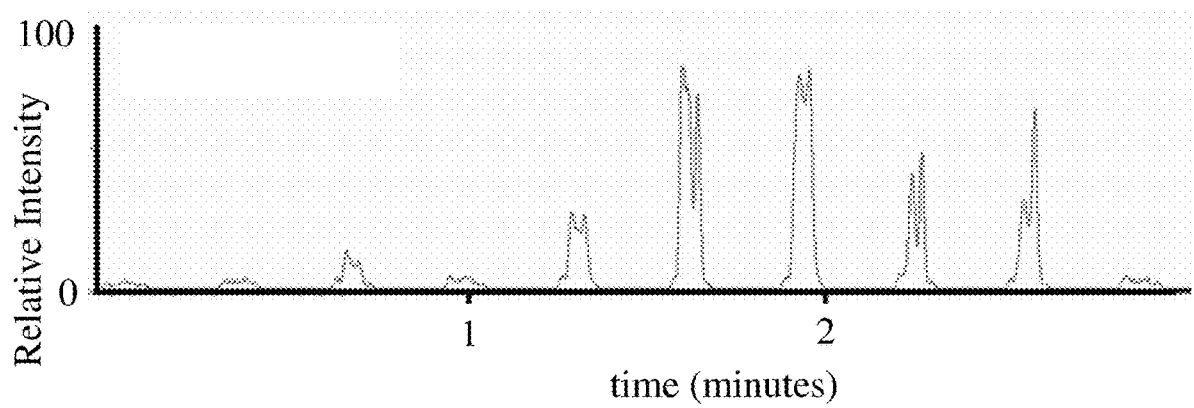
FIG. 8B shows the EIC for m/z 112.1 (Cytosine [M+H]$^+$) resulting from the analysis of a mixture nitrogenous bases uracil and cytosine and nucleosides A and G deposited on a cellulose surface and transferred to a wire mesh surface analyzed with DART MS, according to an embodiment of the invention.

In an embodiment of the invention, a method of collection of pyrimidine bases and nucleosides can be demonstrated by depositing a mixture of pyrimidine bases and nucleosides onto a cellulose surface. A pretreated wire mesh surface can be positioned above that cellulose surface covering the area of the cellulose surface to which the mixture of pyrimidine bases and nucleosides has been applied, see FIG. 3C and a strip of metalized plastic can be positioned on top of the pretreated wire mesh surface. A high voltage power supply can be positioned such that one of its electrodes is in contact with the metalized plastic and the other of its electrodes is in contact with earth ground. The power supply can be energized to generate the high voltage and after a short time interval the power supply can be turned off. The wire mesh strip can be moved to the analytical instrument where it is positioned for chemical analysis. The results of this positive ion analysis are shown in FIG. 8A-8B. FIG. 8A shows the EIC for m/z 268.1 (Adenosine [M+H]$^+$) resulting from the analysis of a mixture containing nitrogenous bases uracil and cytosine and nucleosides A and G deposited on a cellulose surface and transferred to a wire mesh surface analyzed with DART MS. FIG. 8B shows the EIC for m/z 112.1 (Cytosine [M+H]$^+$) resulting from the analysis of a mixture containing nitrogenous bases uracil and cytosine and nucleosides A and G deposited on a cellulose surface and transferred to a wire mesh surface analyzed with DART MS.

Figure 9A:
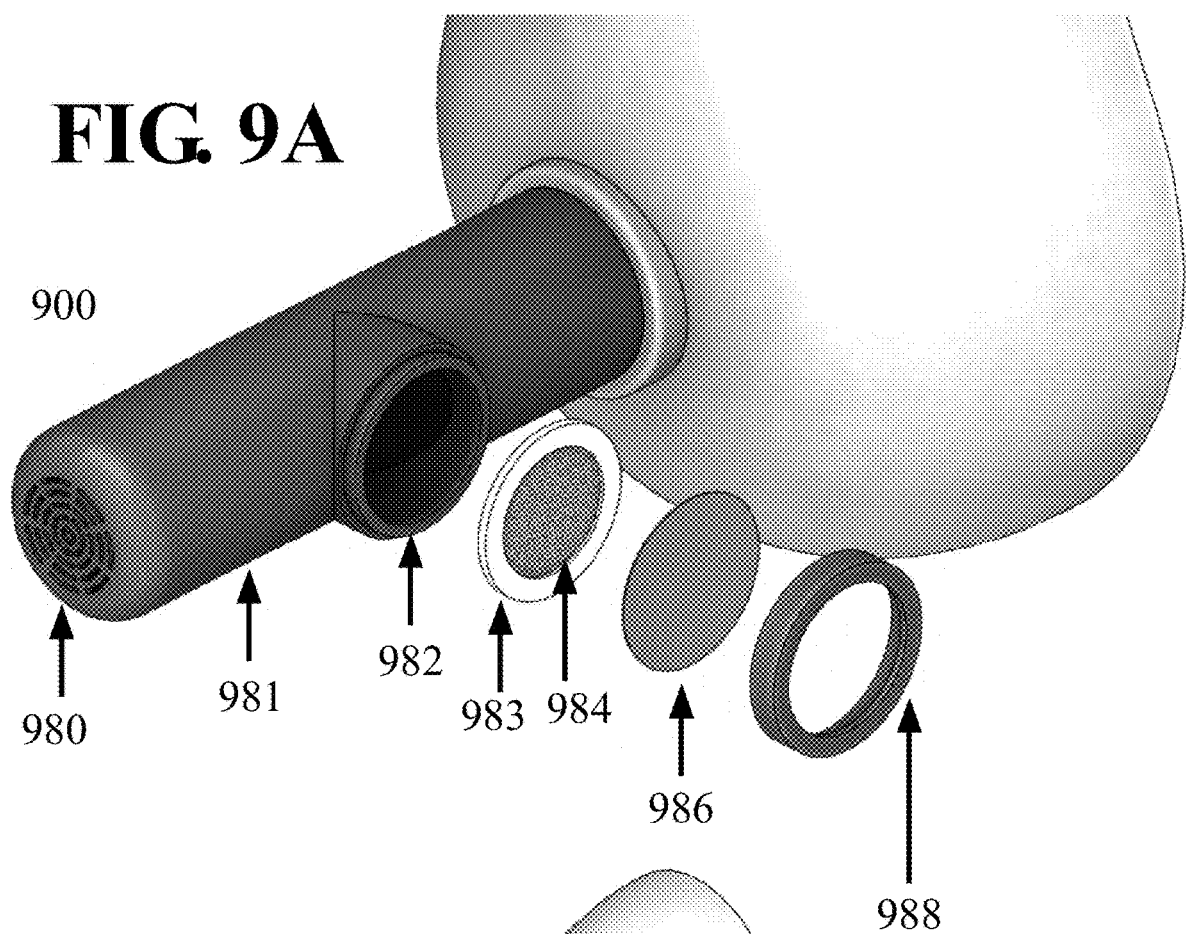
FIG. 9A shows a mask with a container removed for sampling, according to an embodiment of the invention.
Figure 9B:
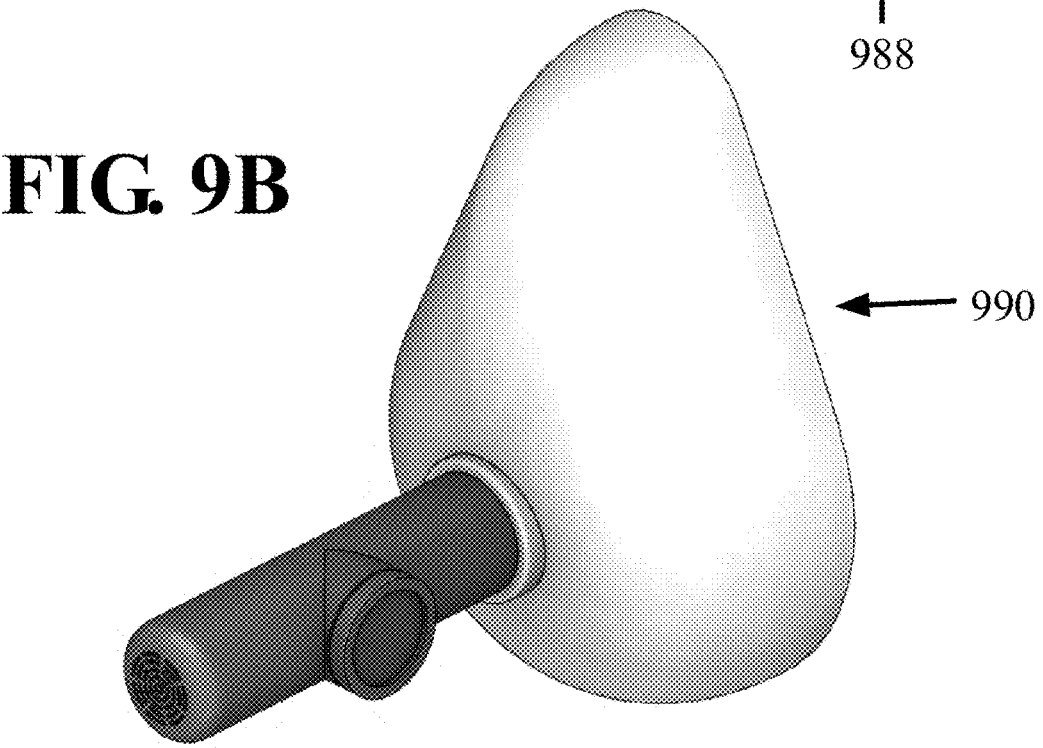
FIG. 9B shows the mask of FIG. 9A with the removable container inserted, according to an embodiment of the invention.

In an embodiment of the invention, a mask can include in addition to the mask filter, a container to analyze contaminants that have been introduced into the air intake of the mask. The mask filter protects others from contaminants, while capturing contaminants the user is exhaling. The container is designed to alert the user that contamination would occur in the absence of the mask (i.e., the N95 disc has protected the user from contamination). FIGS. 9A and 9B show a mask 900 with an air outlet 980, a container 981 attached to a port for attachment of a removable container for collection of particles as they pass from the wearer of the mask 990 at the proximal end of the inlet system 981 to the distal end 980 connecting to the supply of air containing contaminants being exhaled by the user. The removable container attaches to the port 982 and includes a mesh held in place using a ring 983 thus making the mesh a component of the inside of the removable container. A metalized plastic 986 held in an assembly by a retainer 988 is used to seal the mesh in place and permit the introduction of an electrostatic field when it is applied to the surface of the retainer 988 resulting in collection of the particles onto the surface of the mesh as they are removed from the breath of the mask wearer. Removal of the mesh allows for transfer to the DART-MS for analysis.

In an alternative embodiment of the invention, the mask filter protects the user from contaminants by capturing contaminants the user would otherwise be inhaling. The mask can include a container with an air intake 980, an inlet system 981 a port for attachment of a removable container for collection of particles as they pass from the proximal end 980 of the inlet system 981 to the distal end connecting with the mask 990 supplying air to the user.

Figure 10:
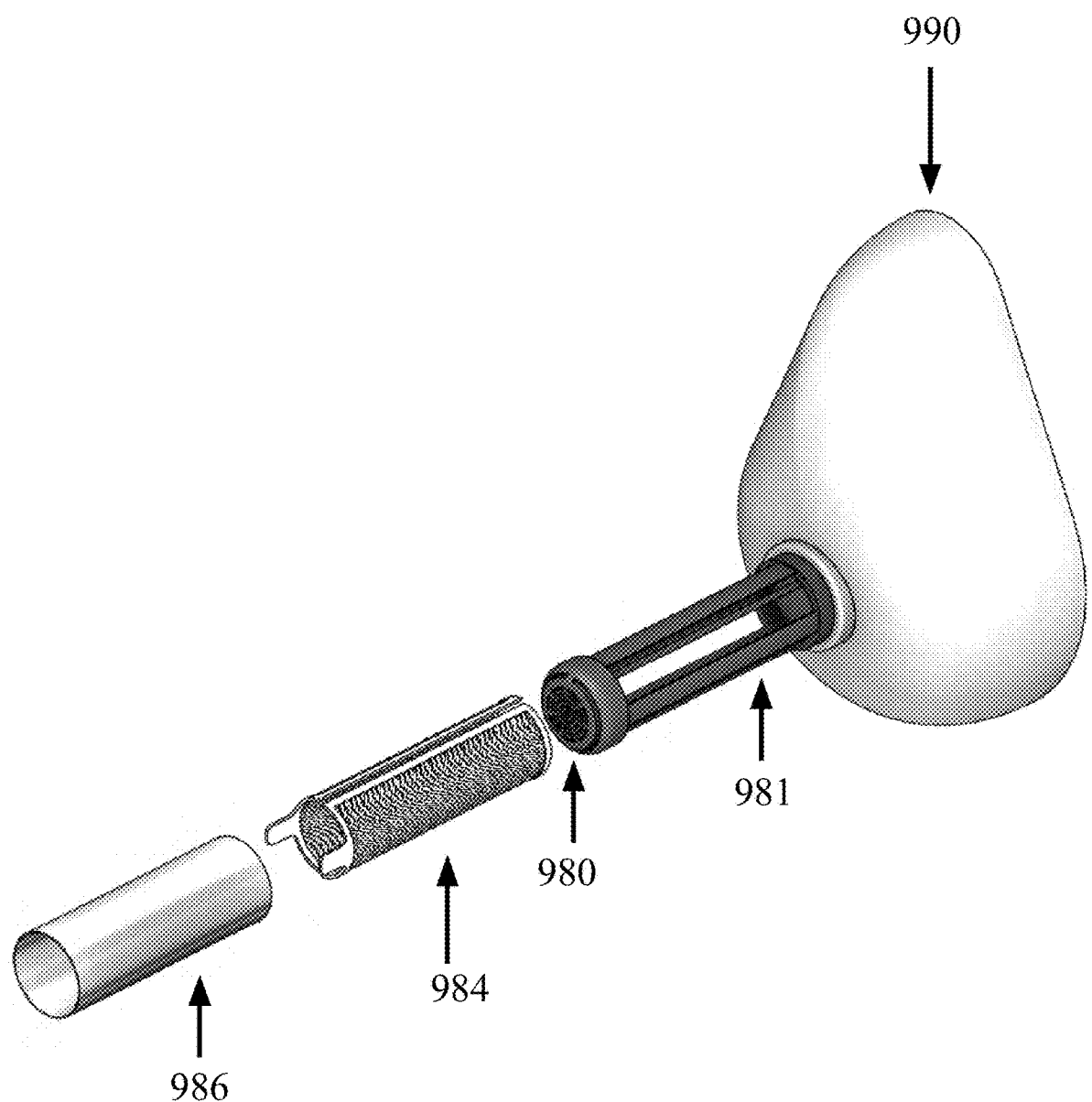
FIG. 10 shows a mask with a removable container for sampling, according to an embodiment of the invention.

In an alternative embodiment of the invention, a mask 900 includes a removable container 981 for collection of particles as they pass through the mask inlet system (see FIG. 10).

In a further embodiment of the invention, the container can be associated with a device used for monitoring the environment at a location.

In an embodiment of the invention, the container can be analyzed by atmospheric ionization. In an alternative embodiment of the invention, the container can be analyzed by ionization techniques that require a vacuum such as laser desorption and matrix assisted laser desorption.

Figure 11:
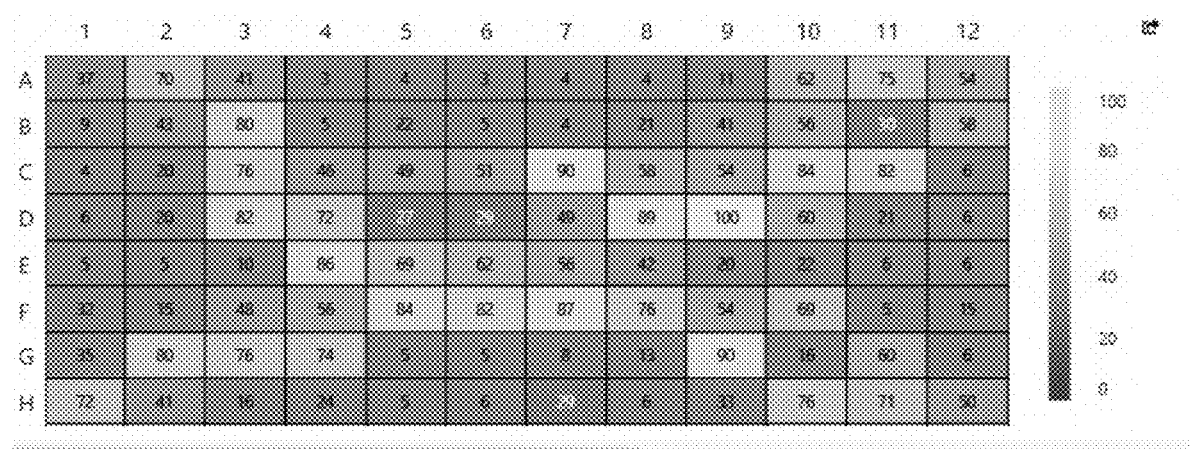
FIG. 11 shows a digitally generated image of the DART-MS analysis of acetaminophen on a QuickStrip-96 large format wire mesh, where the acetaminophen was spread in an 'X' shape onto a cellulosic fiber and transferred with an electrostatic charge to the wire mesh and analyzed, according to an embodiment of the invention.

FIG. 11 shows a shows a digitally generated image of the DART-MS analysis of a QuickStrip-96 large format wire mesh used to sample acetaminophen, where the acetaminophen was collected from a cellulose surface, where the acetaminophen was spread in an 'X' shape onto the cellulosic surface and transferred to the mesh using an electrostatic charge transfer (the wire mesh was placed 2-3 mm above the cellulosic fiber and an aluminized sheet placed on top of the wire mesh and connected to a Van der Graff generator), The wire mesh was subsequently analyzed with DART MS (see FIG. 1A). Unexpectedly, the absolute abundance of the protonated acetaminophen ([M+H]$^+$ detected at m/z 152) can be used to generate a number and thereby a 'heatmap' indicating the abundance of [M+H]$^+$ relative to the abundance in other regions A1-H12 of the mesh spread. FIG. 11 shows an 'X' shape on the heatmap consistent with the areas where the acetaminophen was applied to the cellulosic surface.

In an embodiment of the invention, a hand held high voltage power supply 472 positioned such that it is in contact with top of a wire mesh surface 252 which is positioned directly on the cellulose surface below 585 in order to permit collection of chemicals onto the mesh.

Embodiments contemplated herein further include Embodiments P1-P42 following.

Embodiment P1. A system for ionizing an analyte including a pretreated sampling substrate, a holder adapted to undertake one or more steps including retain the pretreated sampling substrate; orient the pretreated sampling substrate in proximity of a powder sample containing an analyte, and orient the pretreated sampling substrate in proximity of an ionizing species, a power supply configured to energize the pretreated sampling substrate with an electrostatic charge in order to transfer a portion of the analyte to the pretreated sampling substrate; and a desorption ionization source adapted to direct the ionizing species towards the analyte on the pretreated sampling substrate, where the ionizing species generate a plurality of analyte ions.

Embodiment P2. The system of Embodiment P1, where the desorption ionization source is an electrospray ionization source.

Embodiment P3. The system of Embodiment P1, where the desorption ionization source is a DART ionization source.

Embodiment P4. The system of Embodiment P1, where the desorption ionization source utilizes a carrier gas to direct energetic particles at the pretreated sampling substrate.

Embodiment P5. The system of Embodiment P4, where the carrier gas is selected from the group consisting of helium, nitrogen, oxygen, neon, argon, krypton, and xenon.

Embodiment P6. The system of Embodiment P4, where a temperature of the carrier gas is between a lower limit of approximately 270° K and an upper limit of approximately 600° K.

Embodiment P7. The system of Embodiment P4, where the carrier gas is heated to a temperature between a lower limit of approximately 50° C. and an upper limit of approximately 500° C.

Embodiment P8. The system of Embodiment P1, further including analyzing the plurality of analyte ions with a spectrometer.

Embodiment P9. The system of Embodiment P8, further including a gas ion separator, where the gas ion separator is located between the system of claim 1 and an ion detector.

Embodiment P10. The system of Embodiment P1, where the pretreated sampling substrate comprises a viscous liquid selected from the group consisting of glycerol, mineral oil, cottonseed oil, groundnut oil, corn oil, wheat germ oil, olive oil, castor oil, sesame oil, dimethyl formamide and dimethyl sulfoxide, ethyl carbonate, ethyl acetate, benzyl benzoate, propylene glycol, 1,3-butylene glycol, tetrahydrofuran, polyethylene glycols, methyl paraben, fatty acid esters of sorbitan, and mixtures thereof.

Embodiment P11. The system of Embodiment P10, where the pretreated sampling substrate further comprises an alcohol.

Embodiment P12. The system of Embodiment P10, where the desorption ionization source is a matrix assisted laser desorption ionization (MALDI) source, where the pretreated sampling substrate further comprises one or more chemicals selected from the group consisting of 2,5-dihydroxybenzoic acid, 3,5-dimethoxy-4-hydroxy-cinnamic acid, alpha-cyano-4-hydroxycinnamic acid, 3-hydroxypicolinic acid, 2,2':5',2"-Terthiophene and dithranol.

Embodiment P13. The system of Embodiment P1, where the pretreated sampling substrate is non-conducting.

Embodiment P14. The system of Embodiment P13, where a conducting surface is positioned between the pretreated sampling substrate and the power supply.

Embodiment P15. The system of Embodiment P14, where the conducting surface is analyzed with a matrix assisted laser desorption ionization (MALDI) source.

Embodiment P16. The system of Embodiment P1, where the power supply is a Van der Graff generator.

Embodiment P17. A method of ionizing an analyte with an atmospheric pressure ionization device including pretreating a sampling substrate, orienting the sampling substrate in proximity of a powder sample containing an analyte, transferring the powder sample to the sampling substrate using an electrostatic charge and directing ionizing species at the sampling substrate to generate ions of the analyte.

Embodiment P18. The method of Embodiment P17, where the first step involves contacting the sampling substrate with a solution containing a viscous liquid.

Embodiment P19. The method of Embodiment P18, where the viscous liquid is selected from the group consisting of glycerol, mineral oil, cottonseed oil, groundnut oil, corn oil, wheat germ oil, olive oil, castor oil, sesame oil, dimethyl formamide and dimethyl sulfoxide, ethyl carbonate, ethyl acetate, benzyl benzoate, propylene glycol, 1,3-butylene glycol, tetrahydrofuran, polyethylene glycols, methyl paraben, fatty acid esters of sorbitan, and mixtures thereof.

Embodiment P20. The method of Embodiment P17, where step (a) involves contacting the sampling substrate in a solution containing an alcohol.

Embodiment P21. The method of Embodiment P20, where the alcohol is selected from the group consisting of methyl alcohol, ethyl alcohol, n-propyl alcohol, isopropyl alcohol, n-butyl alcohol, sec-butyl alcohol, isobutyl alcohol, t-butyl alcohol, n-pentyl alcohol, isopentyl alcohol, neopentyl alcohol, cyclopentyl alcohol, n-hexanol, cyclohexyl alcohol, n-heptyl alcohol, n-octyl alcohol, n-nonyl alcohol, n-decyl alcohol, allyl alcohol, benzyl alcohol, diphenylcarbinol, triphenylcarbinol, tetrahydrofurfuryl alcohol and mixtures thereof.

Embodiment P22. The method of Embodiment P17, where step (a) involves contacting the sampling substrate in a solution containing an alcohol and water.

Embodiment P23. The method of Embodiment P22, where the alcohol is selected from the group consisting of methyl alcohol, ethyl alcohol, n-propyl alcohol, isopropyl alcohol, n-butyl alcohol, sec-butyl alcohol, isobutyl alcohol, t-butyl alcohol, n-pentyl alcohol, isopentyl alcohol, neopentyl alcohol, cyclopentyl alcohol, n-hexanol, cyclohexyl alcohol, n-heptyl alcohol, n-octyl alcohol, n-nonyl alcohol, n-decyl alcohol, allyl alcohol, benzyl alcohol, diphenylcarbinol, triphenylcarbinol, tetrahydrofurfuryl alcohol and mixtures thereof.

Embodiment P24. The method of Embodiment P22, where the solution has an aqueous component between a lower limit of approximately 2 percent and an upper limit of approximately 80 percent.

Embodiment P25. The method of Embodiment P17, where step (a) involves contacting the sampling substrate in a solution containing a viscous liquid and an alcohol.

Embodiment P26. The method of Embodiment P25, where the viscous liquid is selected from the group consisting of glycerol, mineral oil, cottonseed oil, groundnut oil, corn oil, wheat germ oil, olive oil, castor oil, sesame oil, dimethyl formamide and dimethyl sulfoxide, ethyl carbonate, ethyl acetate, benzyl benzoate, propylene glycol, 1,3-butylene glycol, tetrahydrofuran, polyethylene glycols, methyl paraben, fatty acid esters of sorbitan, and mixtures thereof.

Embodiment P27. The method of Embodiment P25, where the alcohol is selected from the group consisting of methyl alcohol, ethyl alcohol, n-propyl alcohol, isopropyl alcohol, n-butyl alcohol, sec-butyl alcohol, isobutyl alcohol, t-butyl alcohol, n-pentyl alcohol, isopentyl alcohol, neopentyl alcohol, cyclopentyl alcohol, n-hexanol, cyclohexyl alcohol, n-heptyl alcohol, n-octyl alcohol, n-nonyl alcohol, n-decyl alcohol, allyl alcohol, benzyl alcohol, diphenylcarbinol, triphenylcarbinol, tetrahydrofurfuryl alcohol and mixtures thereof.

Embodiment P28. The method of Embodiment P17, where step (a) involves immersing the sampling substrate in a solution containing a viscous liquid, an alcohol and water.

Embodiment P29. The method of Embodiment P28, where the viscous liquid is selected from the group consisting of glycerol, mineral oil, cottonseed oil, groundnut oil, corn oil, wheat germ oil, olive oil, castor oil, sesame oil, dimethyl formamide and dimethyl sulfoxide, ethyl carbonate, ethyl acetate, benzyl benzoate, propylene glycol, 1,3-butylene glycol, tetrahydrofuran, polyethylene glycols, methyl paraben, fatty acid esters of sorbitan, and mixtures thereof.

Embodiment P30. The method of Embodiment P28, where the alcohol is selected from the group consisting of methyl alcohol, ethyl alcohol, n-propyl alcohol, isopropyl alcohol, n-butyl alcohol, sec-butyl alcohol, isobutyl alcohol, t-butyl alcohol, n-pentyl alcohol, isopentyl alcohol, neopentyl alcohol, cyclopentyl alcohol, n-hexanol, cyclohexyl alcohol, n-heptyl alcohol, n-octyl alcohol, n-nonyl alcohol, n-decyl alcohol, allyl alcohol, benzyl alcohol, diphenylcarbinol, triphenylcarbinol, tetrahydrofurfuryl alcohol and mixtures thereof.

Embodiment P31. The method of Embodiment P28, where the solution has an aqueous component between a lower limit of approximately 2 percent and an upper limit of approximately 80 percent.

Embodiment P32. The method of Embodiment P17, where pretreating includes immersing the sampling substrate in a solution and/or dispensing the solution on the sampling substrate.

Embodiment P33. The method of Embodiment P17, where the electrostatic charge is generated using a Van der Graff generator.

Embodiment P34. The method of Embodiment P33, where the sampling substrate is non-conducting.

Embodiment P35. The method of Embodiment P34, where a conducting surface is positioned between the sampling substrate and the Van der Graff generator.

Embodiment P36. A kit for preparing an analyte for ionization and analysis including a pretreated sampling substrate including a holder enclosed in a sterile container and a power supply configured to energize the pretreated sampling substrate with an electrostatic charge in order to transfer a portion of a powder sample to the pretreated sampling substrate, where the pretreated sampling substrate is adapted to allow an ionizing species to be directed to separate regions of the pretreated sampling substrate to allow the ionizing species to form a plurality of analyte ions from the separate regions of the pretreated sampling substrate.

Embodiment P37. The kit of Embodiment P36, further including a conducting surface, where the conducting surface can be located between the pretreated sampling substrate and the power supply.

Embodiment P38. The kit of Embodiment P36, where the power supply is a Van der Graff generator.

Embodiment P39. A device for detecting contamination including a filter, a pretreated sampling substrate and an aluminized sheet, where contacting the aluminized sheet with a power supply transfers a contaminant present on the filter to the pretreated sampling substrate, where the pretreated sampling substrate is adapted to allow an ionizing species to form a plurality of analyte ions from the pretreated sampling substrate.

Embodiment P40. The device of Embodiment P39, further including a holder in which the pretreated sampling substrate can be inserted.

Embodiment P41. A kit for detecting contamination including a filter enclosed in a sterile container, a pretreated sampling substrate including a holder enclosed in a sterile container an aluminized sheet and a power supply configured to energize the aluminized sheet with an electrostatic charge in order to transfer a contaminant present on the filter to the pretreated sampling substrate, where the pretreated sampling substrate is adapted to allow an ionizing species to allow ionizing species to form a plurality of analyte ions from the pretreated sampling substrate.

Embodiment P42. A system for ionizing an analyte including a pretreated sampling substrate, a power supply configured to energize the pretreated sampling substrate with an electrostatic charge in order to transfer a portion of the analyte to the pretreated sampling substrate and a desorption ionization source adapted to direct an ionizing species towards the analyte on the pretreated sampling substrate, where the ionizing species generate a plurality of analyte ions.

Example embodiments of the methods, systems, and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. For example, it is envisaged that, irrespective of the actual shape depicted in the various Figures and embodiments described above, the outer diameter exit of the inlet tube can be tapered or non-tapered and the outer diameter entrance of the outlet tube can be tapered or non-tapered.

Thus, the breadth and scope of the present invention should not be limited by any of the above-described exemplary embodiments, but should be defined only in accordance with the following claims and their equivalents.

What is claimed:

1. A method of ionizing analytes with an atmospheric pressure ionization device comprising:
   (a) pretreating a sampling substrate to increase a particle retention capacity thereof, wherein said pretreating involves contacting the sampling substrate with a solution containing a viscous liquid;

(b) orienting the sampling substrate in proximity of a powder sample containing an analyte;

(c) transferring the powder sample to the sampling substrate using an electrostatic charge; and (d) directing an ionizing species at the sampling substrate to generate ions of the analyte.

2. The method of claim 1, where the viscous liquid is selected from the group consisting of glycerol, mineral oil, cottonseed oil, groundnut oil, corn oil, wheat germ oil, olive oil, castor oil, sesame oil, dimethyl formamide and dimethyl sulfoxide, ethyl carbonate, ethyl acetate, benzyl benzoate, propylene glycol, 1,3-butylene glycol, tetrahydrofuran, polyethylene glycols, methyl paraben, fatty acid esters of sorbitan, and mixtures thereof.

3. The method of claim 1, wherein said solution also contains an alcohol.

4. The method of claim 3, where the alcohol is selected from the group consisting of methyl alcohol, ethyl alcohol, n-propyl alcohol, isopropyl alcohol, n-butyl alcohol, sec-butyl alcohol, isobutyl alcohol, t-butyl alcohol, n-pentyl alcohol, isopentyl alcohol, neopentyl alcohol, cyclopentyl alcohol, n-hexanol, cyclohexyl alcohol, n-heptyl alcohol, n-octyl alcohol, n-nonyl alcohol, n-decyl alcohol, allyl alcohol, benzyl alcohol, diphenylcarbinol, triphenylcarbinol, tetrahydrofurfuryl alcohol and mixtures thereof.

5. The method of claim 1, wherein said solution also contains an alcohol and water.

6. The method of claim 5, where the alcohol is selected from the group consisting of methyl alcohol, ethyl alcohol, n-propyl alcohol, isopropyl alcohol, n-butyl alcohol, sec-butyl alcohol, isobutyl alcohol, t-butyl alcohol, n-pentyl alcohol, isopentyl alcohol, neopentyl alcohol, cyclopentyl alcohol, n-hexanol, cyclohexyl alcohol, n-heptyl alcohol, n-octyl alcohol, n-nonyl alcohol, n-decyl alcohol, allyl alcohol, benzyl alcohol, diphenylcarbinol, triphenylcarbinol, tetrahydrofurfuryl alcohol and mixtures thereof.

7. The method of claim 5, where the solution has an aqueous component between:
a lower limit of approximately 2 percent; and
an upper limit of approximately 80 percent.

8. The method of claim 1, where step (a) involves immersing the sampling substrate in a solution containing a viscous liquid, an alcohol and water.

9. The method of claim 8, where the viscous liquid is selected from the group consisting of glycerol, mineral oil, cottonseed oil, groundnut oil, corn oil, wheat germ oil, olive oil, castor oil, sesame oil, dimethyl formamide and dimethyl sulfoxide, ethyl carbonate, ethyl acetate, benzyl benzoate, propylene glycol, 1,3-butylene glycol, tetrahydrofuran, polyethylene glycols, methyl paraben, fatty acid esters of sorbitan, and mixtures thereof.

10. The method of claim 8, where the alcohol is selected from the group consisting of methyl alcohol, ethyl alcohol, n-propyl alcohol, isopropyl alcohol, n-butyl alcohol, sec-butyl alcohol, isobutyl alcohol, t-butyl alcohol, n-pentyl alcohol, isopentyl alcohol, neopentyl alcohol, cyclopentyl alcohol, n-hexanol, cyclohexyl alcohol, n-heptyl alcohol, n-octyl alcohol, n-nonyl alcohol, n-decyl alcohol, allyl alcohol, benzyl alcohol, diphenylcarbinol, triphenylcarbinol, tetrahydrofurfuryl alcohol and mixtures thereof.

11. The method of claim 8, where the solution has an aqueous component between:
a lower limit of approximately 2 percent; and
an upper limit of approximately 80 percent.

12. The method of claim 1, where pretreating includes immersing the sampling substrate in a solution and/or dispensing the solution on the sampling substrate.

13. The method of claim 1, where the electrostatic charge is generated using a Van der Graaff generator.

14. The method of claim 13, where the sampling substrate is non-conducting.

15. The method of claim 14, where a conducting surface is positioned between the sampling substrate and the Van der Graff generator.

16. The method of claim 1, where the ionizing species are generated with an ionization source selected from the group consisting of Direct Analysis Real Time (DART) source, a Dielectric barrier discharge (DBDI) source and a Desorption Electrospray Ionization (DESI) source.

* * * * *